(12) United States Patent
Lyatkher et al.

(10) Patent No.: US 10,920,751 B2
(45) Date of Patent: Feb. 16, 2021

(54) ORTHOGONAL TURBINE HAVING A SPEED ADJUSTING MEMBER

(71) Applicant: Ziaur Rahman, Seattle, WA (US)

(72) Inventors: Victor Lyatkher, Richmond Heights, OH (US); Andrey Nikiforov, Key Colony Beach, FL (US)

(73) Assignee: Ziaur Rahman, Seattle, WA (US)

( * ) Notice: Subject to any disclaimer, the term of this patent is extended or adjusted under 35 U.S.C. 154(b) by 0 days.

(21) Appl. No.: 16/218,045

(22) Filed: Dec. 12, 2018

(65) Prior Publication Data
US 2020/0191119 A1    Jun. 18, 2020

(51) Int. Cl.
F03D 7/06 (2006.01)
F03D 3/02 (2006.01)
F03D 3/00 (2006.01)

(52) U.S. Cl.
CPC .............. F03D 7/06 (2013.01); F03D 3/002 (2013.01); F03D 3/02 (2013.01); F05B 2260/902 (2013.01)

(58) Field of Classification Search
CPC ... F03D 7/06; F03D 3/002; F03D 3/02; F03D 3/005
See application file for complete search history.

(56) References Cited

U.S. PATENT DOCUMENTS

| | | | | |
|---|---|---|---|---|
| 1,180,085 A * | 4/1916 | Stirtan | ............ | F03D 3/00 416/50 |
| 1,835,018 A * | 12/1931 | Darrieus | ............ | F01D 1/14 415/224 |
| 4,180,367 A * | 12/1979 | Drees | ............ | F03D 3/002 416/119 |
| 4,383,801 A * | 5/1983 | Pryor | ............ | F03D 3/068 416/119 |
| 4,415,312 A * | 11/1983 | Brenneman | ............ | F03D 3/061 416/119 |
| 5,098,264 A * | 3/1992 | Lew | ............ | F04C 2/44 416/119 |
| 5,676,524 A * | 10/1997 | Lukas | ............ | F03D 3/068 416/111 |
| 6,253,700 B1 | 7/2001 | Gorlov | | |

(Continued)

OTHER PUBLICATIONS

V. Lyatkher, "Wind power turbine design selection and optimization," Fig. 1.11, 2014.

*Primary Examiner* — Christopher Verdier
*Assistant Examiner* — Theodore C Ribadeneyra
(74) *Attorney, Agent, or Firm* — The Law Offices Of Eric W. Peterson

(57) ABSTRACT

An orthogonal turbine having a first blade, a second blade, a first traverse connected to the first blade, a second traverse connected to the second blade, a first speed adjusting member having a first void, a first rear stop, and a first front stop, a second speed adjusting member, a disc having a first pin connected to the disc, and a shaft connected to the disc, where the shaft is configured to rotationally engage the first speed adjusting member and the shaft is configured to rotationally engage the second speed adjusting member, where the first speed adjusting member is connected to the first traverse, where the second speed adjusting member is connected to the second traverse, where the first speed adjusting member is rotationally engaged to the second speed adjusting member, and where the first void is configured to receive the first pin.

19 Claims, 14 Drawing Sheets

(56) References Cited

U.S. PATENT DOCUMENTS

| | | | |
|---|---|---|---|
| 7,083,382 B2* | 8/2006 | Ursua | F03D 3/005 |
| | | | 416/110 |
| 7,586,209 B1 | 9/2009 | Lyatkher | |
| 7,741,729 B2 | 6/2010 | Lyatkher | |
| 8,047,785 B2 | 11/2011 | Lyatkher | |
| 9,062,657 B2* | 6/2015 | Sobocinski | F03B 17/065 |
| 9,644,604 B2* | 5/2017 | Whinney | F03D 7/06 |
| 2008/0213083 A1* | 9/2008 | Unno | F03D 3/067 |
| | | | 415/4.2 |
| 2008/0258469 A1* | 10/2008 | Stephens | F03D 3/002 |
| | | | 290/55 |
| 2009/0035134 A1* | 2/2009 | Kuo | F03D 3/068 |
| | | | 416/119 |
| 2009/0136346 A1* | 5/2009 | Kelly | F03D 3/068 |
| | | | 416/131 |
| 2009/0196753 A1* | 8/2009 | Yan | F03D 3/061 |
| | | | 416/147 |
| 2011/0020123 A1* | 1/2011 | Anderson | F03D 3/068 |
| | | | 416/98 |
| 2011/0171033 A1* | 7/2011 | Hara | F03D 3/065 |
| | | | 416/223 R |
| 2011/0305569 A1* | 12/2011 | Kim | F03D 3/068 |
| | | | 416/5 |
| 2013/0045080 A1* | 2/2013 | Kirke | F03D 3/068 |
| | | | 415/53.1 |
| 2013/0189101 A1* | 7/2013 | Coulson | F03B 17/065 |
| | | | 416/9 |
| 2014/0099204 A1* | 4/2014 | Debleser | F03D 3/064 |
| | | | 416/23 |
| 2014/0147274 A1* | 5/2014 | Longmire | F03D 7/06 |
| | | | 416/13 |
| 2015/0003982 A1* | 1/2015 | Radovich | F03D 7/06 |
| | | | 416/1 |
| 2015/0147176 A1* | 5/2015 | Curutchet | F03D 3/068 |
| | | | 416/41 |
| 2015/0233352 A1* | 8/2015 | Rath | F03D 7/06 |
| | | | 416/23 |
| 2016/0097372 A1* | 4/2016 | Monaco | F03D 3/02 |
| | | | 416/143 |
| 2016/0230742 A1* | 8/2016 | Rao | F03D 7/06 |
| 2016/0281681 A1* | 9/2016 | MacDonald | F03D 3/068 |
| 2016/0290316 A1* | 10/2016 | Morbiato | F03D 7/06 |
| 2018/0017038 A1* | 1/2018 | Cimatti | F03D 1/06 |
| 2018/0100485 A1* | 4/2018 | Kelly | F03D 3/064 |
| 2018/0142673 A1* | 5/2018 | Wu | F03D 3/005 |
| 2019/0040845 A1* | 2/2019 | Potter | F03D 13/35 |
| 2019/0085820 A1* | 3/2019 | Bray | F03D 7/06 |
| 2019/0093627 A1* | 3/2019 | Wang | F03D 7/06 |
| 2019/0093628 A1* | 3/2019 | Lin | F03D 3/064 |
| 2019/0145379 A1* | 5/2019 | Potter | F03D 7/06 |
| | | | 416/1 |
| 2019/0153998 A1* | 5/2019 | Fracaroli | F03D 7/06 |

\* cited by examiner

ORTHOGONAL TURBINE HAVING A SPEED ADJUSTING MEMBER

BACKGROUND

Kinetic energy in flowing medium, such as water and wind, is a known source for power generating systems. Hydroelectric and wind-powered electrical generation systems have been used to generate large quantities of power, including those relying on vertical axis or orthogonal turbines. Current orthogonal based hydro-electric and wind-powered electrical generation systems have many disadvantages including energy loss and reduced system efficiency. Specifically, upon a blade passing through the front side of the blade rotation, a positive or pushing force is affected upon the traverse of the orthogonal turbine, resulting in the rotation of the orthogonal turbine. However, upon the blade passing through a lateral side of the blade rotation, a negative or pulling force is affected upon the traverse. The blade is pushed through the lateral side of the blade rotation and does not contribute to the rotation of the orthogonal turbine. Such pulling forces can result in resistance to the rotation of the orthogonal turbine and a loss of energy.

SUMMARY OF THE INVENTION

The present disclosure pertains to an orthogonal turbine having a first blade, a second blade, a first traverse connected to the first blade, a second traverse connected to the second blade, a first speed adjusting member having a first void, a first rear stop, and a first front stop, a second speed adjusting member, a disc having a first pin connected to the disc, and a shaft connected to the disc, where the shaft is configured to rotationally engage the first speed adjusting member and the shaft is configured to rotationally engage the second speed adjusting member, where the first speed adjusting member is connected to the first traverse, where the second speed adjusting member is connected to the second traverse, where the first speed adjusting member is rotationally engaged to the second speed adjusting member, and where the first void is configured to receive the first pin. Another aspect of the disclosure is an orthogonal turbine where the second speed adjusting member comprises a second void, a second rear stop, and a second front stop, where the disc further comprises a second pin connected to the disc, and where the second void is configured to receive the second pin.

Another aspect of the disclosure is an orthogonal turbine having a spring, where the spring is coupled to the first speed adjusting member. Another aspect of the disclosure is an orthogonal turbine where the first void is configured to receive the spring. Another aspect of the disclosure is an orthogonal turbine where the spring is configured to touch the first front stop. Another aspect of the disclosure is an orthogonal turbine where the spring is configured to touch the first rear stop. Another aspect of the disclosure is an orthogonal turbine having a first bearing configured to touch the first speed adjusting member and a second bearing configured to touch the second speed adjusting member.

Another aspect of the disclosure is an orthogonal turbine where the first void is configured to allow for the disc to rotate through at least a portion of a rotation without the first traverse applying a negative rotational force to the disc. Another aspect of the disclosure is an orthogonal turbine where the first void is configured to allow for the first pin to travel a distance within the first speed adjusting member without touching the first speed adjusting member. Another aspect of the disclosure is an orthogonal turbine where the first void is configured to allow for the disc to rotate at a rotational speed different than a rotational speed of the first speed adjusting member. Another aspect of the disclosure is an orthogonal turbine where the first void is configured to allow for the first speed adjusting member to rotate at a rotational speed different than a rotational speed of the second speed adjusting member.

Another aspect of the disclosure is an orthogonal turbine where the first speed adjusting member and second speed adjusting member are in a first position, the first speed adjusting member is configured to transfer a rotational force to the second speed adjusting member, and where the first speed adjusting member and second speed adjusting member are in a second position, the second speed adjusting member is configured to transfer a rotational force to the first speed adjusting member.

Another aspect of the disclosure is an orthogonal turbine where the first speed adjusting member is configured to transfer a rotational force to the second speed adjusting member by way of the first rear stop touching the first pin, and where the second speed adjusting member is configured to transfer a rotational force to the first speed adjusting member by way of the first pin touching the first front stop. Another aspect of the disclosure is an orthogonal turbine where the first speed adjusting member is configured to transfer a rotational force to the second speed adjusting member by way of the first rear stop touching the first pin and the second pin touching the second front stop, and where the second speed adjusting member is configured to transfer a rotational force to the first speed adjusting member by way of the second rear stop touching the second pin and the first pin touching the first front stop.

Another aspect of the disclosure is an orthogonal turbine where the first speed adjusting member and second speed adjusting member are configured so that the radial degrees between the first traverse and second traverse, where the first traverse is in a first position and the second traverse is in a first position, are different than the radial degrees between the first traverse and second traverse, where the first traverse is in a second position and the second traverse is in a second position.

Another aspect of the disclosure is an orthogonal turbine where the first speed adjusting member and second speed adjusting member are configured so that where the first traverse is in a first position and the second traverse is in a first position, the first traverse is positioned in a pushing zone and the second traverse is positioned in a neutral zone, and where the first traverse is in a second position and the second traverse is in a second position, the first traverse is in a pushing zone and the second traverse is in a pulling zone.

BRIEF DESCRIPTION OF THE DRAWINGS

The accompanying drawings, which are incorporated herein and form part of the specification, illustrate various embodiments of the present invention and together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION

In the following detailed description, reference is made to the accompanying drawings which form a part hereof and in which is shown by way of illustration specific embodiments in which the invention may be practiced. These embodiments are described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

The present disclosure pertains to an orthogonal turbine 100 having increased efficiency of its energy production. In one embodiment, the orthogonal turbine 100 is configured to reduce the amount of negative rotational force affecting the shaft 140. The reduction in the amount of negative rotational force affecting the shaft 140 increases the rotational speed of the shaft 140, thus increasing the efficiency of the orthogonal turbine 100.

The orthogonal turbine 100 can be positioned within any area that provides for a medium flow f, for example, without limitation, bodies of water, such as seas, lakes, reservoirs, rivers, or the like, areas with wind, or the like. The orthogonal turbine 100 allows for energy to be extracted from a medium flow f and converted into useful energy. The orthogonal turbine 100 is driven by the kinetic energy of the medium flow f. The orthogonal turbine 100 may be oriented in any direction, such as horizontally, vertically, angled, or the like. In some embodiments, the orthogonal turbine 100 is oriented such that the blade 110 is positioned transversely to the direction of medium flow f to allow for rotation of the orthogonal turbine 100 in a plane parallel to the direction of medium flow f.

Figure 1:
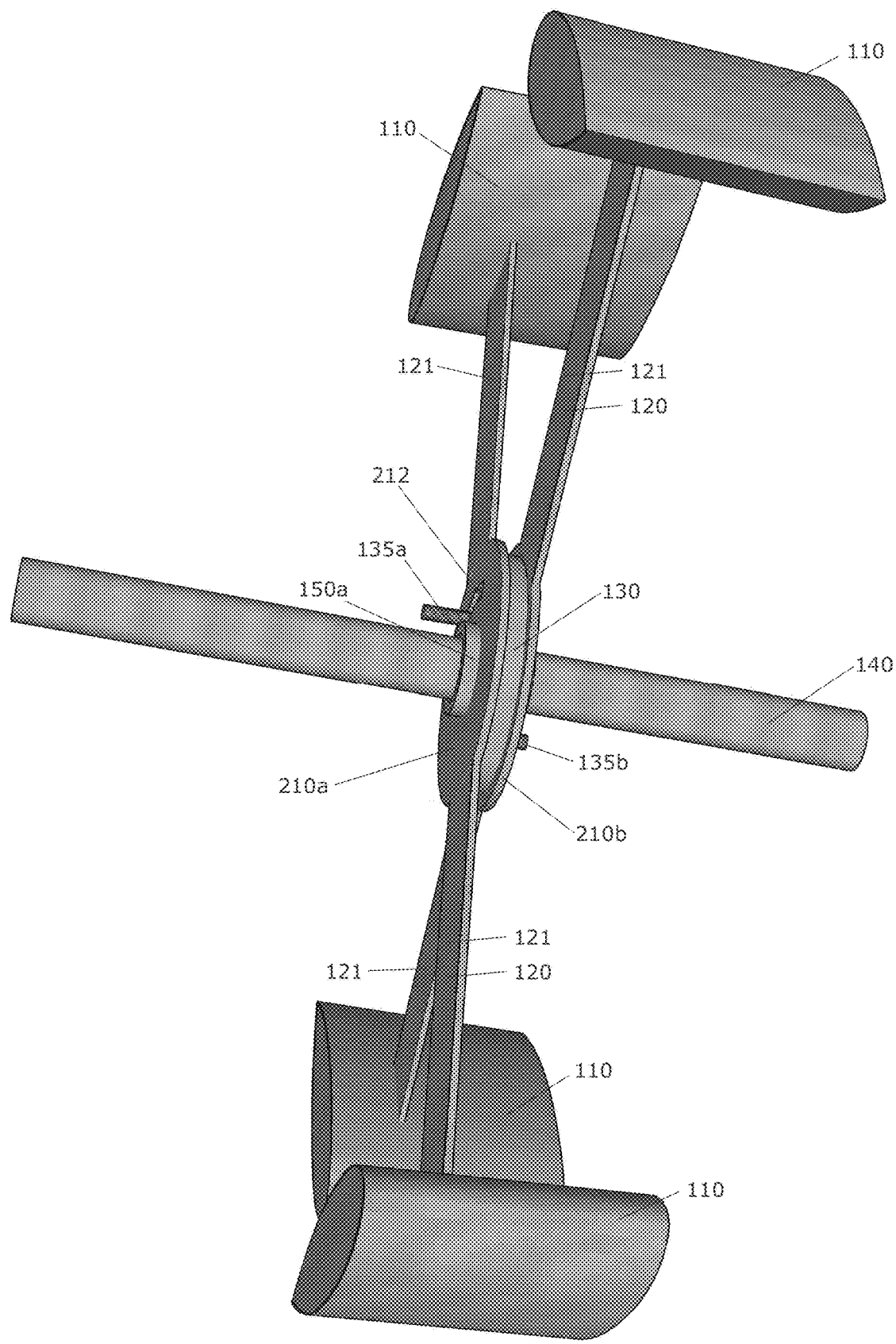
FIG. 1 is a perspective view of an orthogonal turbine according to an exemplary embodiment.
Figure 2:
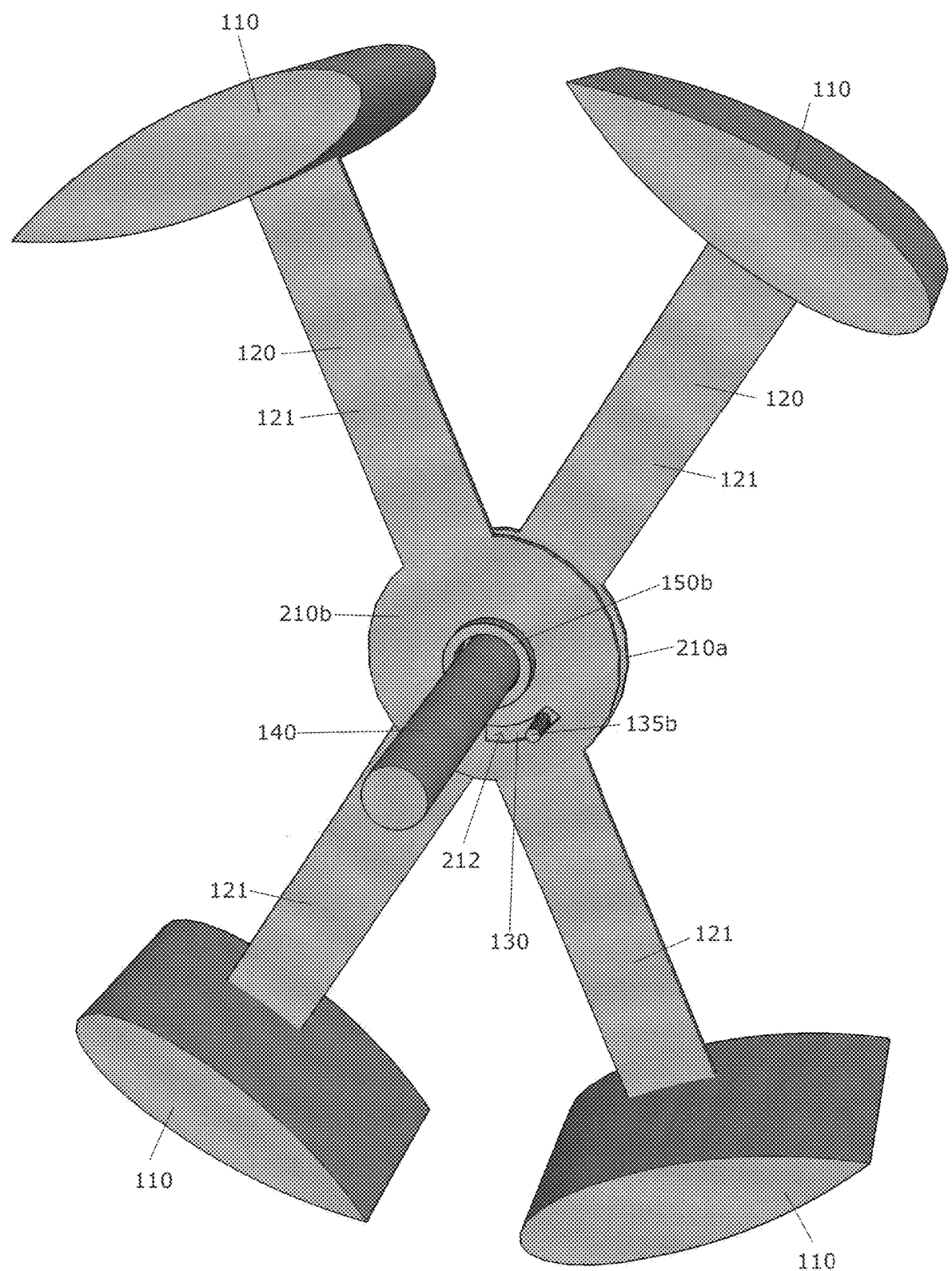
FIG. 2 is a perspective view of an orthogonal turbine according to an exemplary embodiment.
Figure 3:
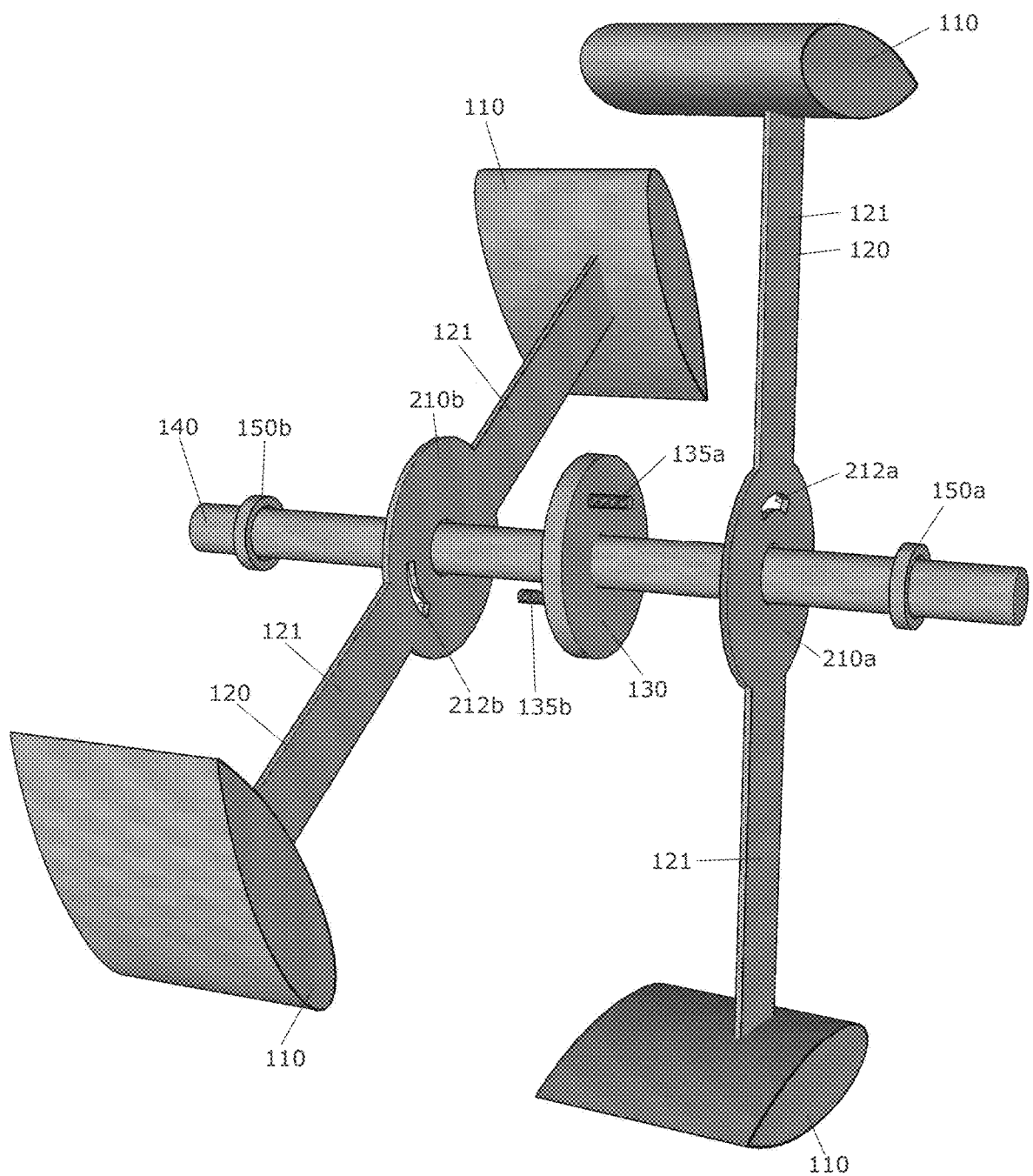
FIG. 3 is an exploded view of an orthogonal turbine according to an exemplary embodiment.

In one embodiment, as shown in FIGS. 1-3, the orthogonal turbine 100 can have a blade 110, a traverse 121, a speed adjusting member 210, a disc 130, and a shaft 140. In general, the force from the medium flow f acting on the blade 110 creates a force that rotates the shaft 140. The shaft 140 can transfer the rotational energy captured by the blade 110 to the generator.

In one embodiment, the orthogonal turbine 100 can have at least one blade 110 coupled to a traverse set 120. The orthogonal turbine 100 is configured so that the force of the medium flow f affecting the blade 110 is transferred to the shaft 140. In one embodiment, the force of the medium flow f affecting the blade 110 is transferred to the traverse 121 coupled thereto. The blade 110 is configured to receive a force from the medium flow f that results in the creation of a rotational force affecting the blade 110 and traverse 121. In one embodiment, the blade 110 has a shape of an air foil. In one embodiment, the blade 110 is coupled to the traverse 121 at a substantially normal angle. The blade 110 can be oriented so that the force from the medium flow f affects the blade 110 to create a rotational force having either a clockwise or counter-clockwise direction.

Figure 4:
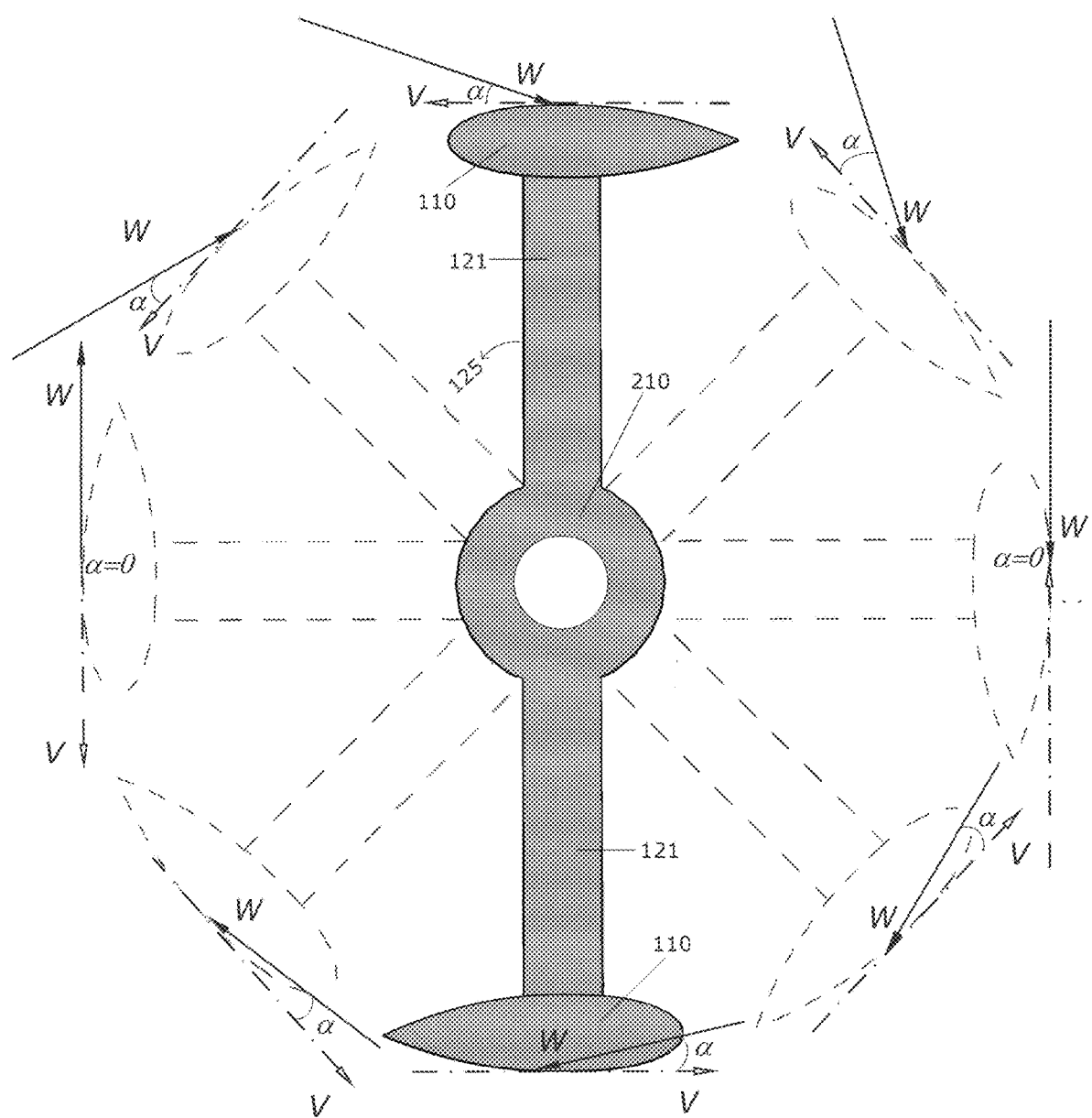
FIG. 4 is a plan view of a traverse set according to an exemplary embodiment.

As shown in FIG. 4, upon the medium flow f acting on the blade 110, a traverse force 125 acting upon the traverse 121 rotates the shaft 140. The strength of the traverse force 125 can change depending on the positioning of the blade 110 within the degrees of rotation of the orthogonal turbine 100. As the blade 110 changes rotational position about the shaft 140, the angle of attack $\alpha$, or the angle between the vector of the apparent medium flow W and vector of the blade speed V, the projection of lift, and/or the drag forces to the tangential direction can change. A change in the angle of attack $\alpha$, the projection of lift, and/or the drag forces to the tangential direction can alter the strength of the traverse force 125, thereby altering the rotational speed of the traverse 121.

For example, without limitation, where the blade 110 is positioned at 0 degrees of rotation, the angle of attack $\alpha$ is approximately 15 degrees. Here, the traverse force 125 is greatest at the position of 0 degrees of rotation. As the blade 110 rotates from 0 to 90 degrees and/or 180 to 270 degrees, the angle of attack $\alpha$ can increase and/or decrease, thereby causing the traverse force 125 to decrease. As the blade 110 rotates from 90 to 180 degrees and/or 270 to 360 degrees, the angle of attack $\alpha$ can increase and/or decrease, thereby causing the traverse force 125 to increase.

Figure 5:
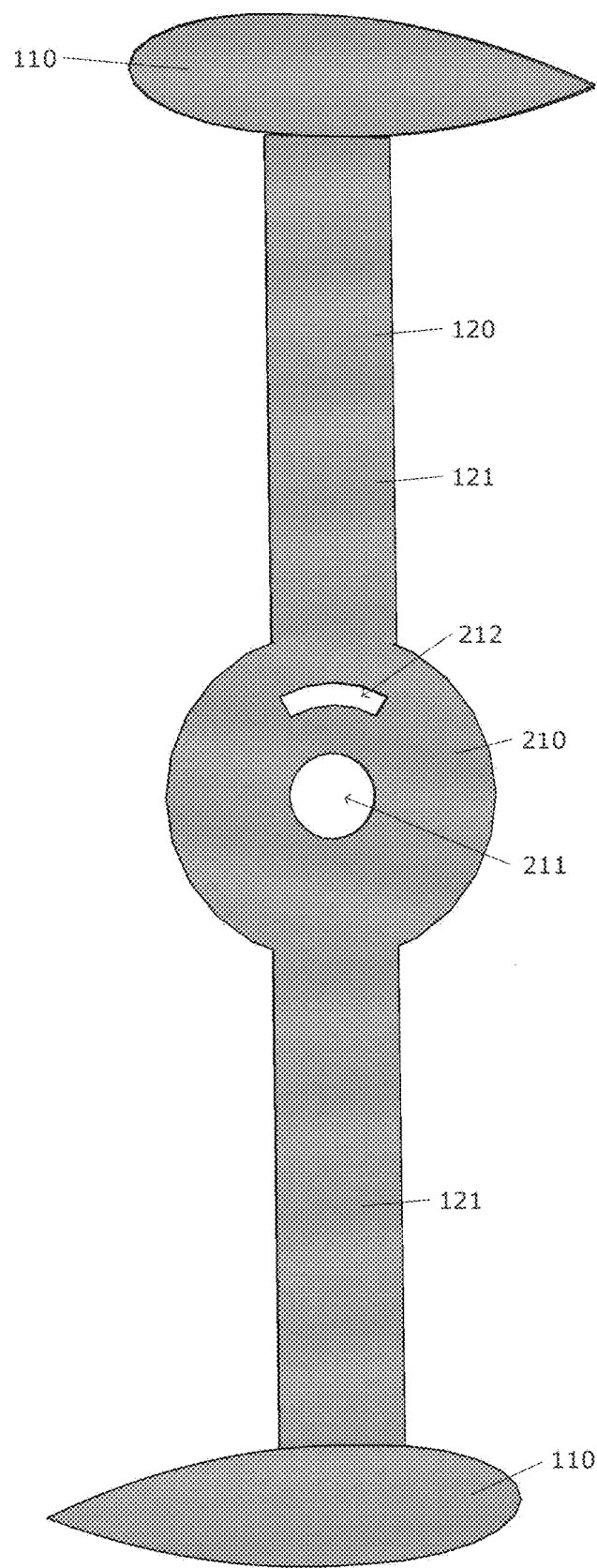
FIG. 5 is a plan view of a traverse set according to an exemplary embodiment.

In one embodiment, as shown in FIG. 5, the orthogonal turbine 100 can have at least two traverse sets 120. While the traverse set 120 can have at least one traverse 121, the traverse set 120 preferably has two traverses 121. The traverse 121 can be coupled to a speed adjusting member 210 at a first end 123 of the traverse 121 and a blade 110 at a second end 124 of the traverse 121. The traverse 121 can be positioned radially within the orthogonal turbine 100 where the traverse 121 extends outwardly in a substantially radial direction from the axial center of the orthogonal turbine 100.

The medium flow f acting on each blade 110 creates a rotational force acting on the traverse set 120. This traverse force 125 is transferred to the disc 130 by way of the speed adjusting member 210 coupled to the traverse set 120. The traverse force 125 exerted onto the disc 130 can vary depending on the position of the blade 110 or traverse 121 within the rotation of the orthogonal turbine 100. The traverse force 125 can exert a positive rotational force or a negative rotational force onto the disc 130 depending on the position of the blade 110 or traverse 121 within the degrees of rotation of the orthogonal turbine 100.

In one embodiment, the orthogonal turbine 100 can have zones of rotation through which the traverse set 120 can travel, where the zone is defined by the traverse force 125 affected onto the disc 130. In one embodiment, the traverse sets 120 are positioned where a first traverse set 120 is positioned within a first zone and a second traverse set 120 is positioned within a second zone. In one embodiment, the orthogonal turbine 100 can have at least one of each of a pushing zone 310, neutral zone 320, and pulling zone 330.

Figure 6A:
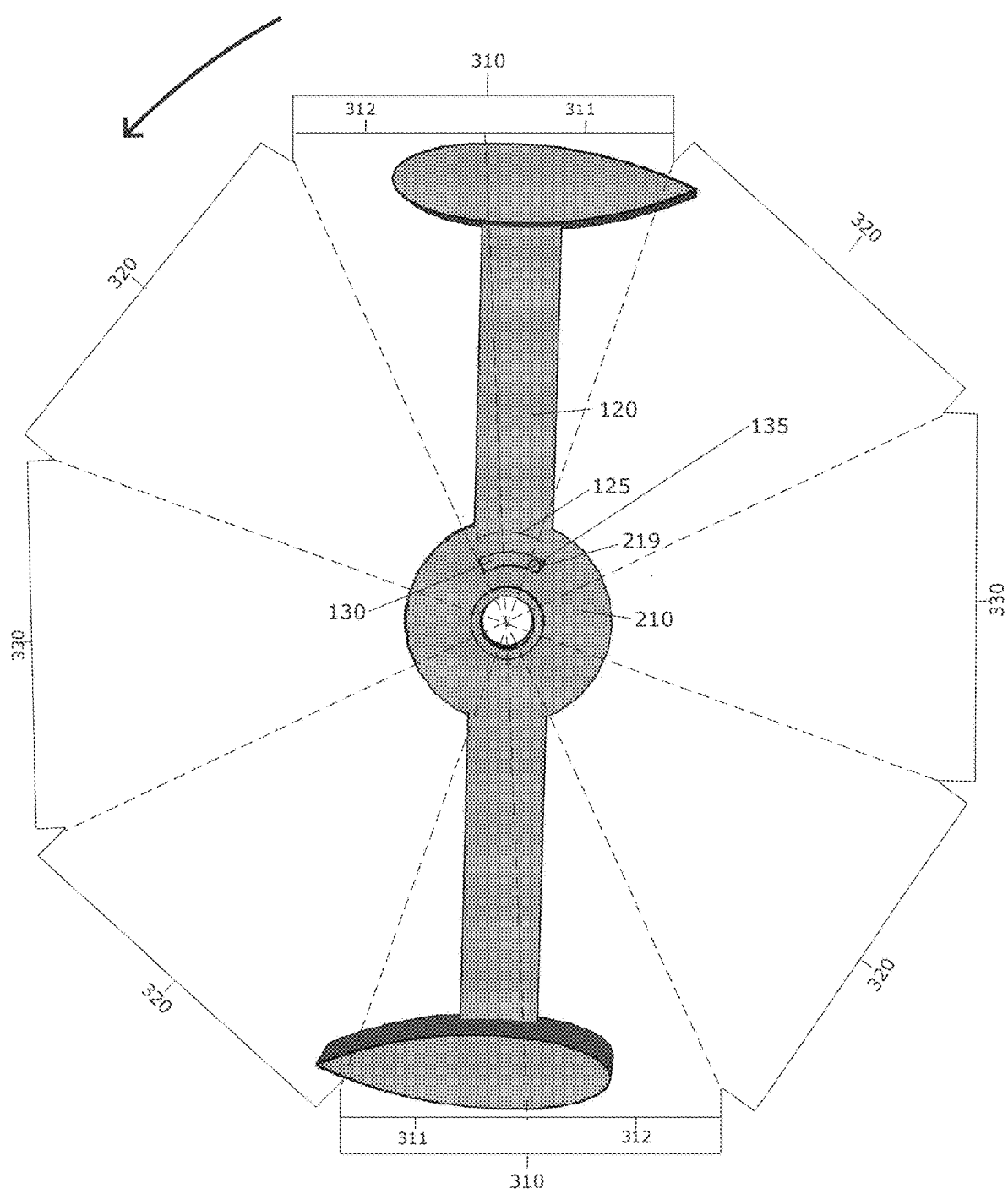
FIG. 6a is a perspective view of a traverse set according to an exemplary embodiment.

In one embodiment, as shown in FIG. 6a, the traverse set 120 can be configured to be positioned within and/or travel through at least one pushing zone 310. Where a traverse set 120 is positioned within a pushing zone 310, the traverse force 125 affected onto the disc 130 can be a positive rotational force. While the positive rotational force and negative rotational force is described and shown to have a clockwise direction and counter-clockwise direction, respectively, it is to be understood that the direction of the positive rotational force can be counter-clockwise and the direction of the negative rotational force can be clockwise. Where the positive rotational force is greater than the negative rotational forces affected onto the disc 130, the positive rotational speed of the disc 130 increases. In one embodiment, the pushing zone 310 can be the range of rotational degrees where the rear stop 219 affects a positive rotational force onto the pin 135. For example, without limitation, the pushing zone 310 can be between 305-45 and 125-235 rotational degrees. In one embodiment, the rear stop 219 affects a positive rotational force onto the pin 135 upon the rear stop 219 touching the pin 135. The pushing zone 310 can have a portion in which the traverse force 125 increases and can have a portion in which the traverse force 125 decreases. In one embodiment, as the traverse set 120 travels through the pushing zone 310, the traverse force 125 increases during the first portion 311 of the pushing zone 310 and the traverse force 125 decreases during the second portion 312 of the pushing zone 310.

Figure 6B:
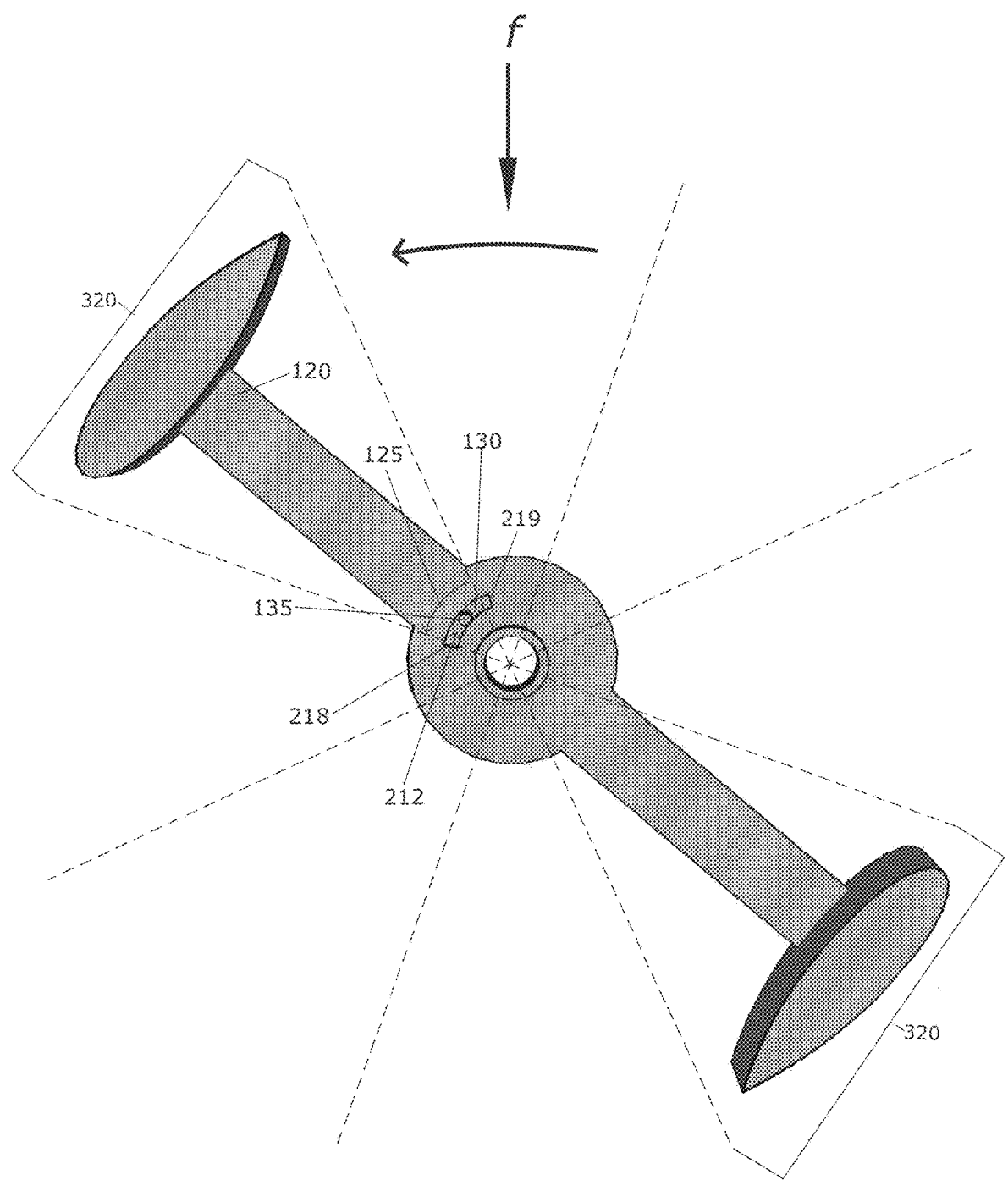
FIG. 6b is a perspective view of a traverse set according to an exemplary embodiment.

In one embodiment, as shown in FIG. 6b, the traverse set 120 can be configured to be positioned within and/or travel through at least one neutral zone 320. Where a traverse set 120 is positioned within a neutral zone 320, the traverse set 120 is configured to rotate without affecting a force upon the disc 130. In one embodiment, the speed adjusting member 210 allows for the traverse set 120 to rotate without affecting a traverse force 125 upon the disc 130, for example, without limitation, by the pin 135 traveling the length of the void 212 without affecting a traverse force 125 upon the rear stop 219 or front stop 218. In one embodiment, the neutral zone 320 can be the range of rotational degrees between where the rear stop 219 affects a positive rotational force onto the pin and where the front stop 218 affects a negative rotational force onto the pin 135. For example, without limitation, the neutral zone 320 can be between 45-60, 115-125, 235-250, and 290-305 rotational degrees. In one embodiment, the neutral zone 320 can be the range of rotational degrees between where the rear stop 219 touches the pin 135 and where the front stop touches the pin 135. In one embodiment, as the traverse set 120 travels through the neutral zone 320, the traverse force 125 can decrease or increase.

Figure 6C:
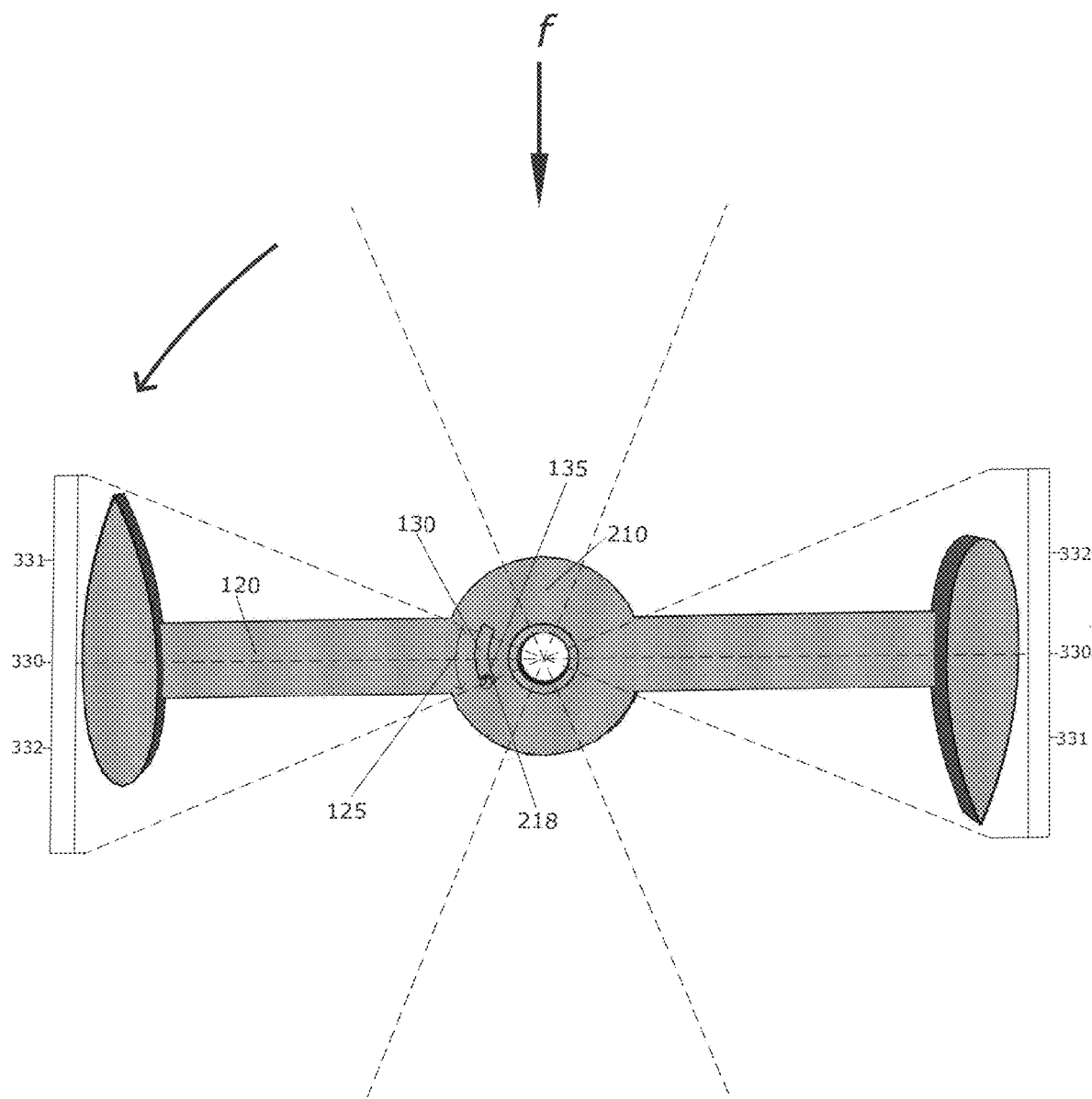
FIG. 6c is a perspective view of a traverse set according to an exemplary embodiment.

In one embodiment, as shown in FIG. 6c, the traverse set 120 can be configured to be positioned within and/or travel through at least one pulling zone 330. Where a traverse set 120 is positioned within a pulling zone 330, the traverse force 125 affected onto the disc 130 can be a negative rotational force. Where the negative rotational force is greater than the positive rotational forces affected onto the disc 130, the positive rotational speed of the disc 130 decreases. In one embodiment, the pulling zone 330 can be the range of rotational degrees where the front stop 218 affects a negative rotational force onto the pin 135. For example, without limitation, the pulling zone 330 can be between 60-115 and 250-290 rotational degrees. In one embodiment, the front stop 218 affects a negative rotational force onto the pin 135 upon the front stop 218 touching the pin 135. The pulling zone 330 can have a portion of the zone in which the traverse force 125 increases and can have a portion of the zone in which the traverse force 125 decreases. In one embodiment, as the traverse set 120 for travels through the pulling zone 330, the traverse force 125 decreases during the first portion 331 of the pulling zone 330 and the traverse force 125 increases during the second portion 332 of the pulling zone 330.

In one embodiment, the traverse sets 120 are positioned at different degrees of rotation in relation to each other, so that where one traverse set 120 is positioned within a pulling zone 330 and thereby affecting a negative rotational force onto the disc 130 or within a neutral zone 320 and thereby not affecting a positive rotational force onto the disc 130, another traverse set 120 is positioned within a pushing zone 310 and thereby affecting a positive rotational force onto the disc 130. The positioning of the traverse sets 120 can allow for the orthogonal turbine 100 to have at least one traverse set 120 positioned within the pushing zone 310, thereby constantly exerting a positive rotational force onto the disc 130. Such orientation of the traverse sets 120 in relation to each other allows for a continual positive rotational force onto the disc 130 thereby resulting in a continual rotation of the disc 130. In one embodiment, the positioning of a traverse set 120 within the pushing zone 310 causes a rotation of a traverse set 120 within the pulling zone 330.

In one embodiment, the orthogonal turbine 100 can have a disc 130 configured to transfer rotational energy from the speed adjusting member 210 to the shaft 140. The disc 130 is configured to allow for the transfer of rotational energy between the speed adjusting member 210 and the shaft 140. The disc 130 can have a hole 131 configured to receive the shaft 140. In one embodiment, the disc 130 is coupled to the shaft 140 where upon rotation of the disc 130, the shaft 140 is rotated. In one embodiment, the disc 130 can be rotationally coupled to the speed adjusting member 210 where upon rotation of the disc 130, the speed adjusting member 210 is rotated, and/or upon rotation of the speed adjusting member 210, the disc 130 is rotated. The disc 130 can have a first surface 132 and second surface 133.

In one embodiment, the disc 130 can have at least one pin set configured to allow for the transfer of rotational energy between the disc 130 and the speed adjusting member 210. A pin set can have at least one pin 135 for each void 212 in a speed adjusting member 210. In one embodiment, a first pin 135a can be coupled to the first surface 132 of the disc 130 and/or a second pin 135b can be coupled to the second surface 133 of the disc 130. The first pin 135a can protrude from the first surface 132 and/or a second fin 135b can protrude from second surface 133 of the disc 130 to allow for a substantially normal angle between the pins 135a,b and the first surface 132 and/or the second surface 133, respectively. The pin 135 can be any protruding member configured to transfer rotational force from the speed adjusting member 210 to the disc 130 and/or configured to transfer rotational force from the disc 130 to the speed adjusting member 210. The pin 135 can be, for example, without limitation, a peg, rod, knob, or the like. The pin 135 can be any shape that allows for the pin 135 to be received by the void 212 in the speed adjusting member 210. In one embodiment, the number of pins 135 coupled to the disc 130 corresponds to the number of voids 212 in the speed adjusting member(s) 210. Upon rotation of the disc 130, the pin 135 can rotate in an arc pathway about the shaft 140.

In one embodiment, the orthogonal turbine 100 can have at least one speed adjusting member 210. The speed adjusting member 210 can be configured to transfer rotational energy from the at least one traverse 121 to the disc 130, and/or configured to transfer rotational energy from the disc 130 to the at least one traverse 121. The speed adjusting member 210 can be coupled to the at least one traverse set 120 with the disc 130. While in the preferred embodiment, the speed adjusting member 210 is coupled to one traverse set 120, the speed adjusting member 210 can be coupled to a plurality of traverse sets 120. Where the speed adjusting member 210 is coupled to a traverse set 120 having a plurality of traverses 121, the traverses 121 can be radially spaced apart on the speed adjusting member 210 at an equal distance. For example, without limitation, where the speed adjusting member 210 is coupled to a traverse set 120 having two traverses 121, one traverse 121 is spaced 180 degrees from the other traverse 121. The speed adjusting member 210 can be coupled to at least one traverse set 120 so that upon movement of the traverse set 120, the speed adjusting member 210 is rotated, and/or upon movement of the speed adjusting member 210, the at least one traverse set 120 is rotated.

By way of example, without limitation, a first speed adjusting member 210a can be coupled to a first traverse set 120 and a second speed adjusting member 210b can be coupled to a second traverse set 120, where the first speed adjusting member 210a can be coupled to the disc 130 by way of a first pin set and the second speed adjusting member 210b can be coupled to the disc 130 by way of a second pin set. The first speed adjusting member 210a can rotationally engage the second speed adjusting member 210b.

In one embodiment, the orthogonal turbine 100 is configured to transfer rotational force from a first speed adjusting member 210a to a second speed adjusting member 210b and/or from a second speed adjusting member 210b to a first speed adjusting member 210a. In one embodiment, where the first speed adjusting member 210a and second speed adjusting member 210b are in a first position, the first speed adjusting member 210a is configured to transfer rotational force to the second speed adjusting member 210b, and wherein where the first speed adjusting member 210a and second speed adjusting member 210b are in a second position, the second speed adjusting member 210b is configured to transfer a rotational force to the first speed adjusting member 210a.

In one embodiment, the orthogonal turbine 100 is configured to allow the disc 130, by way of a first pin 135a coupled to a first speed adjusting member 210a, to apply a rotational force to the first speed adjusting member 210a, and configured to allow a second speed adjusting member 210b, by way of a second pin 135b coupled to a second speed adjusting member 210b, to apply a rotational force to the disc 130, where the first speed adjusting member 210a is in a first position and the second speed adjusting member 210b is in a first position. In one embodiment, the orthogonal turbine 100 is configured to allow the disc 130, by way of the second pin 135b coupled to a second speed adjusting member 210b, to apply a rotational force to the second speed adjusting member 210b, and configured to allow the first speed adjusting member 210a, by way of a first pin 135a coupled to a first speed adjusting member 210a, to apply a rotational force to the disc 130, where the first speed adjusting member 210a is in a second position and the second speed adjusting member 210b is in a second position.

In one embodiment, the first speed adjusting member 210a is configured to transfer a rotational force to the second speed adjusting member 210b by way of the first rear stop 219a touching the first pin 135a, and the second speed adjusting member 210b is configured to transfer a rotational force to the first speed adjusting member 210a by way of the first pin 135a touching the first front stop 218a. In one embodiment, the first speed adjusting member 210a is configured to transfer a rotational force to the second speed adjusting member 210b by way of the first rear stop 219a touching the first pin 135a and the second pin 135b touching the second front stop 218a, and wherein the second speed adjusting member 210b is configured to transfer a rotational force to the first speed adjusting member 210a by way of the second rear stop 219b touching the second pin 135b and the first pin 135a touching the first front stop 218a.

In one embodiment, the speed adjusting member 210 can have a center hole 211 configured to receive the shaft 140 allowing for the speed adjusting member 210 to be rotationally coupled to the shaft 140 about the axial center of the shaft 140.

Figure 7:
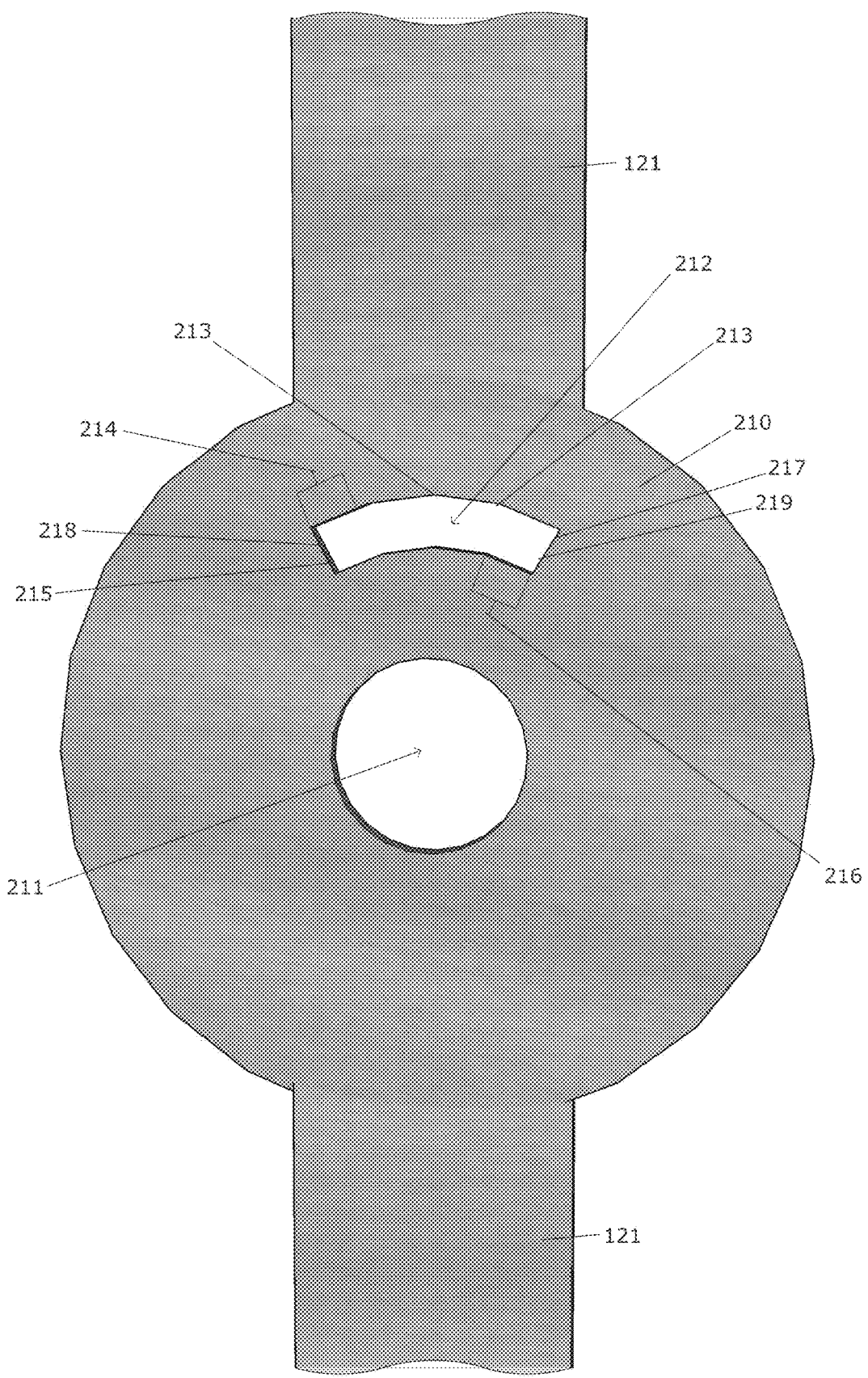
FIG. 7 is a plan view of a speed adjusting member according to an exemplary embodiment.

In one embodiment, as shown in FIG. 7, the speed adjusting member 210 can have a void 212 configured to receive a pin 135 coupled to the disc 130. The void 212 can have a length greater than the width or diameter of the pin 135, thereby allowing the pin 135 to traverse the void 212. The void 212 can be a channel whereby the channel prevents the end of the pin 135 from passing through the entire thickness of the speed adjusting member 210, a hole whereby the hole allows for the end of the pin 135 to pass through the entire thickness of the speed adjusting member 210, a slot, or the like. The void 212 can be any shape configured to allow a pin 135 to traverse a length of the speed adjusting member 210, for example, without limitation, an arc, circle, or the like. Where the void 212 is in the shape of an arc, the radial degrees of the arc of the void 212 is substantially equal to the radial degrees of the rotation of the pin 135 thereby allowing the pin 135 to traverse the length of the void 212. In one embodiment, the distance between the pin 135 and the axial center of the shaft 140 is substantially the same as the distance between the arced longitudinal center line of the void 212 and the axial center of the shaft 140. The length of the void 212 can be any length that allows for the pin 135 to traverse 121 at least a portion of the speed adjusting member 210. In one embodiment, the length of the void 212 corresponds to the radial degrees of the neutral zone 320. The arched length of the void 212 can be increased or decreased depending on the desired radial size of the neutral zone 320. In one embodiment, the first speed adjusting member 210a has a first void 212a. In one embodiment, the first speed adjusting member 210a has a first void 212a and a second speed adjusting member 210b have a second void 212b.

The speed adjusting member 210 can have a perimeter 213 defining the void 212 where the void 212 has a first area 214 at least partially defined by a first end 215 of the perimeter 213 and the void 212 has a second area 216 at least partially defined by a second end 217 of the perimeter 213. In one embodiment, the speed adjusting member 210 has a front stop 218 and/or a rear stop 219. In one embodiment, the front stop 218 is connected to the speed adjusting member 210. In one embodiment, the rear stop 219 is connected to the speed adjusting member 210. The front stop 218 can be the first end 215 of the perimeter 213 and the rear stop 219 can be the second end 217 of the perimeter 213. In one embodiment, the void 212 is configured to allow for the pin 135 to traverse the void 212 between the first end 215 and the second end 217, and/or between the front stop 218 and the rear stop 219. In one embodiment, the void 212 is configured to allow the disc 130 to rotate through at least a portion of the rotational degrees without the traverse with the void 212 positioned therein applying a negative rotational force to the disc 130.

In one embodiment, the speed adjusting member 210 is configured so that upon the rear stop 219 engaging or touching the pin 135, the speed adjusting member 210 applies a rotational force to the pin 135 thereby rotating the disc 130. In one embodiment, the speed adjusting member 210 is configured so that upon the front stop 218 engaging or touching the pin 135, the pin 135 applies a rotational force to the speed adjusting member 210, thereby rotating the speed adjusting member 210 and in turn the traverse set 120.

In one embodiment, the orthogonal turbine 100 is configured to allow the disc 130, by way of a first pin 135a coupled to a first speed adjusting member 210a, to apply a rotational force to the first speed adjusting member 210a, and configured to allow a second speed adjusting member 210b, by way of a second pin 135b coupled to a second speed adjusting member 210b, to apply a rotational force to the disc 130, where the first speed adjusting member 210a is in a first position and the second speed adjusting member 210b is in a first position. In the same embodiment, the orthogonal turbine 100 is configured to allow the disc 130, by way of the second pin 135b coupled to a second speed adjusting member 210b, to apply a rotational force to the second speed adjusting member 210b, and configured to allow the first speed adjusting member 210a, by way of a first pin 135a coupled to a first speed adjusting member 210a, to apply a rotational force to the disc 130, where the first speed adjusting member 210a is in a second position and the second speed adjusting member 210b is in a second position.

In one embodiment, the first speed adjusting member 210a and second speed adjusting member 210b are configured so that the radial degrees between the first traverse 121a and second traverse 121b, where the first traverse 121a is in a first position and the second traverse 121b is in a first position, are different than the radial degrees between the first traverse 121a and second traverse 121b, where the first traverse 121a is in a second position and the second traverse 121b is in a second position.

Figure 8B:
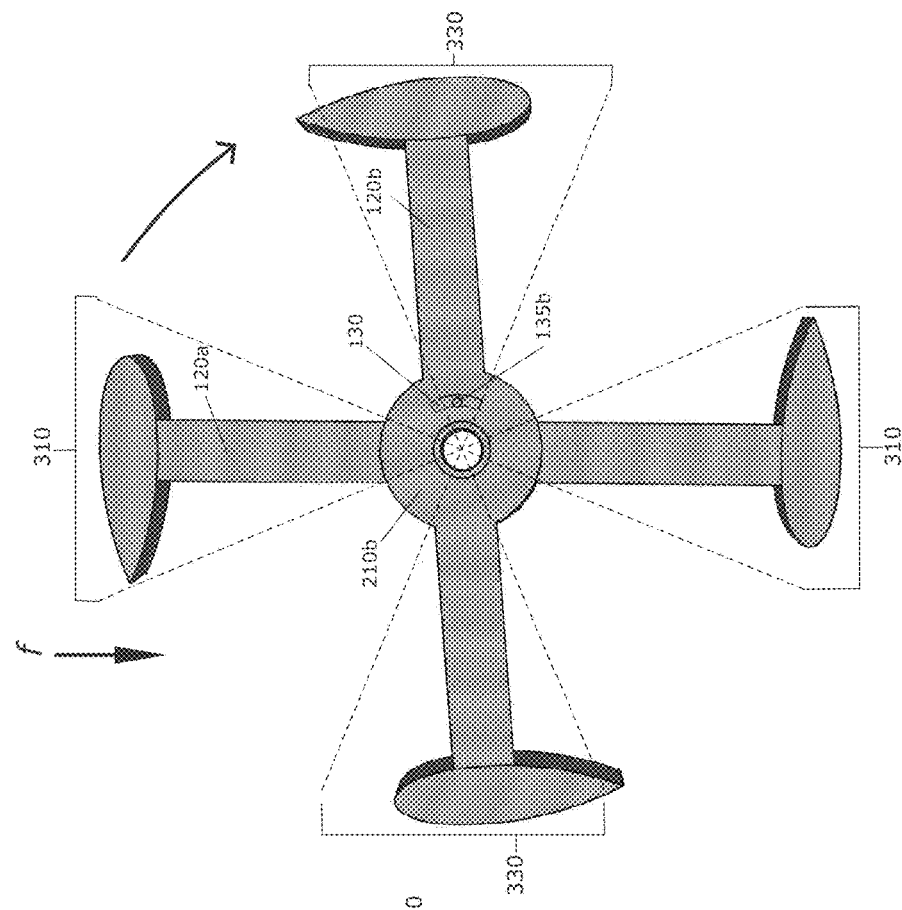
FIG. 8b is a rear perspective view of two traverse sets according to an exemplary embodiment.
Figure 8A:
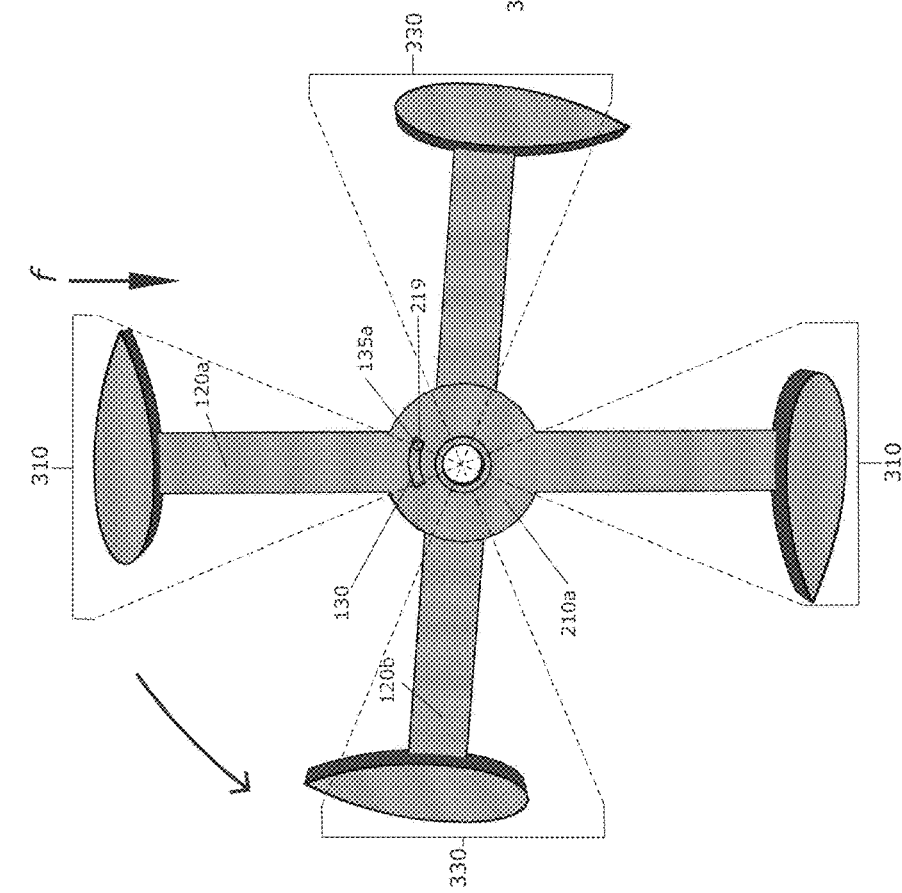
FIG. 8a is a front perspective view of two traverse sets according to an exemplary embodiment.

In one embodiment, as shown in FIGS. 8a-8b, the second traverse set 120b coupled to the second speed adjusting member 210b can be positioned within a pulling zone 330 and the first traverse set 120a coupled to the first speed adjusting member 210a can be positioned within a pushing zone 310, so that the rotational force from the first speed adjusting member 210a rotates the disc 130 by way of the first pin 135a, thereby rotating the second pin 135b and the second speed adjusting member 210b.

Figure 9B:
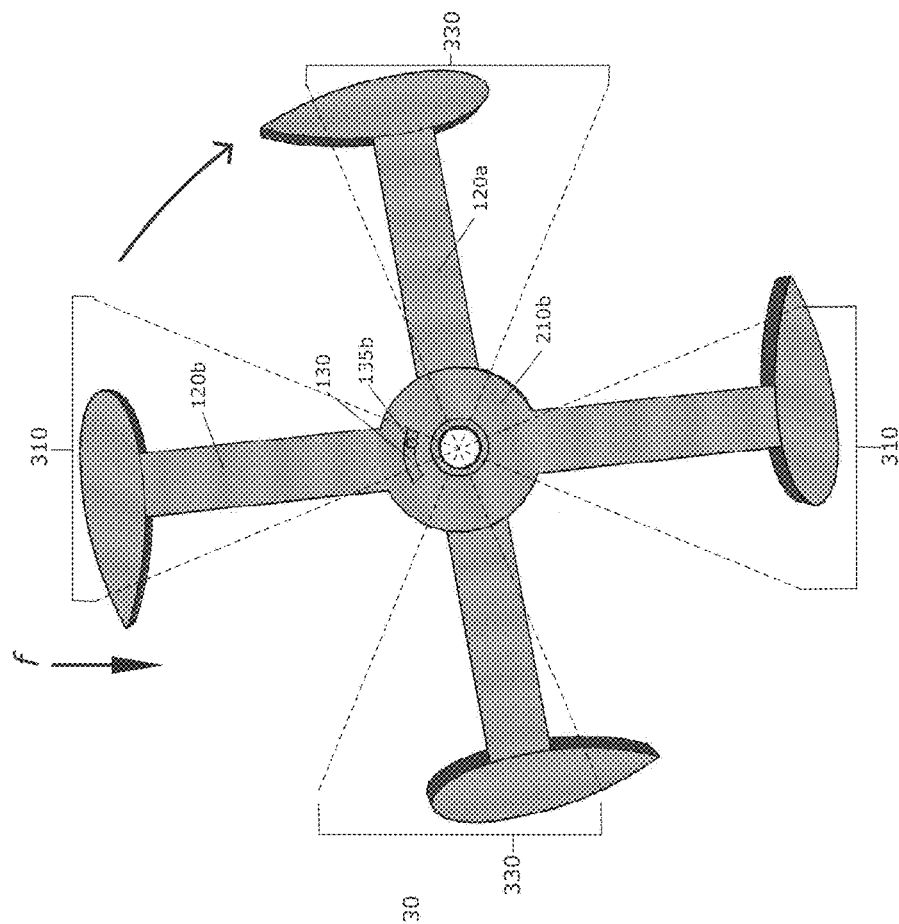
FIG. 9b is a rear perspective view of two traverse sets according to an exemplary embodiment.
Figure 9A:
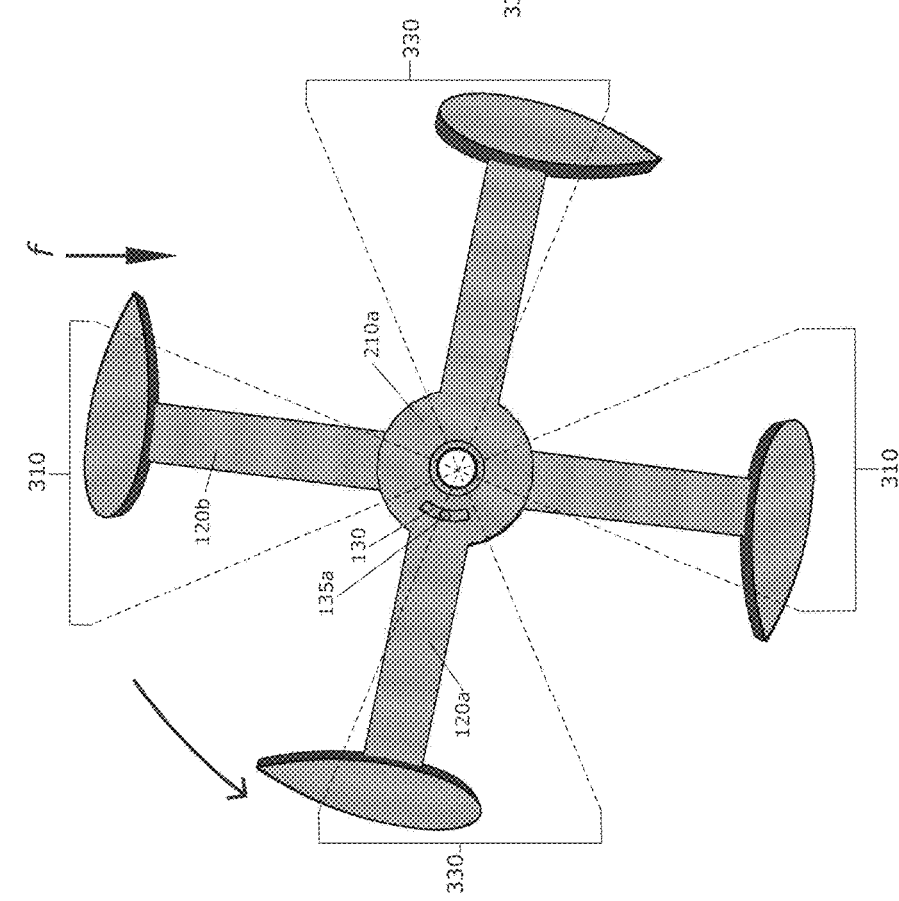
FIG. 9a is a front perspective view of two traverse sets according to an exemplary embodiment.

As shown in FIGS. 9a-9b, upon the second traverse set 120b coupled to the second speed adjusting member 210b traveling to a position within a pushing zone 310 and the first traverse set 120a coupled to the first speed adjusting member 210a traveling to a position within a pulling zone 330, the rotational force from the second speed adjusting member 210b rotates the disc 130 by way of the second pin 135b thereby rotating the first pin 135a and the first speed adjusting member 210a. In one embodiment, the positive rotational force applied by the first pin 135a to the first speed adjusting member 210a and the positive rotational force applied by the second pin 135b to the second speed adjusting member 210b are in the same rotational direction.

In one embodiment, the first position of the first speed adjusting member 210a is positioned in a zone different from the zone in which the first position of the second speed adjusting member 210b is positioned. In one embodiment, the second position of the first speed adjusting member 210a is positioned in a zone different from the zone in which the second position of the second speed adjusting member 210b is positioned. For example, without limitation, the first position of the first speed adjusting member 210a is located within a pushing zone 310 and the first position of the second speed adjusting member 210b is located within a pulling zone 330, and the second position of the first speed adjusting member 210a is the located within a pulling zone 330 and the second position of the second speed adjusting member 210b is located within a pushing zone 310. By way of another example, without limitation, the first position of the first traverse 121a is located within a pushing zone 310 and the first position of the second traverse 121b is located within a neutral zone 320, and the second position of the first traverse 121a is the located within a pushing zone 310 and the second position of the second traverse 121b is located within a pulling zone 330.

In one embodiment, the first speed adjusting member 210a is configured to affect a positive rotational force onto the disc 130 where the first speed adjusting member 210a is in a first position and the first speed adjusting member 210a is configured to receive a negative rotational force affected by the disc 130 where the first speed adjusting member 210a is in a second position. In one embodiment, the second speed adjusting member 210b is configured to receive a negative rotational force affected by the disc 130 where the second speed adjusting member 210b is in a first position and the second speed adjusting member 210b is configured to affect a positive rotational force onto the disc 130 where the second speed adjusting member 210b is in a second position.

In one embodiment, the speed adjusting member 210 is configured to allow for the traverse set 120 positioned within the neutral zone 320 to travel through the neutral zone 320 without the traverse set 120 exerting a negative rotational force onto the disc 130.

In one embodiment, the speed adjusting member 210 is configured to reduce the amount of negative rotational force affecting the disc 130. The speed adjusting member 210 is configured to reduce the amount of negative rotational force onto the disc 130 by the traverse set 120. This occurs by reducing the amount of time that the traverse set 120 is in the pulling zone 330 and/or reduces the amount of degrees in the pulling zone 330. In one embodiment, the void 212 in the speed adjusting member 210 decreases the amount of time or amount of rotational degrees that the traverse set 120 is in the pulling zone 330 by allowing for the pin 135 to travel a distance within the speed adjusting member 210 without touching the front stop 218. In one embodiment, the void 212 is configured to allow for the pin 135 to travel a distance within the speed adjusting member 210 without touching the speed adjusting member 210.

Figure 10B:
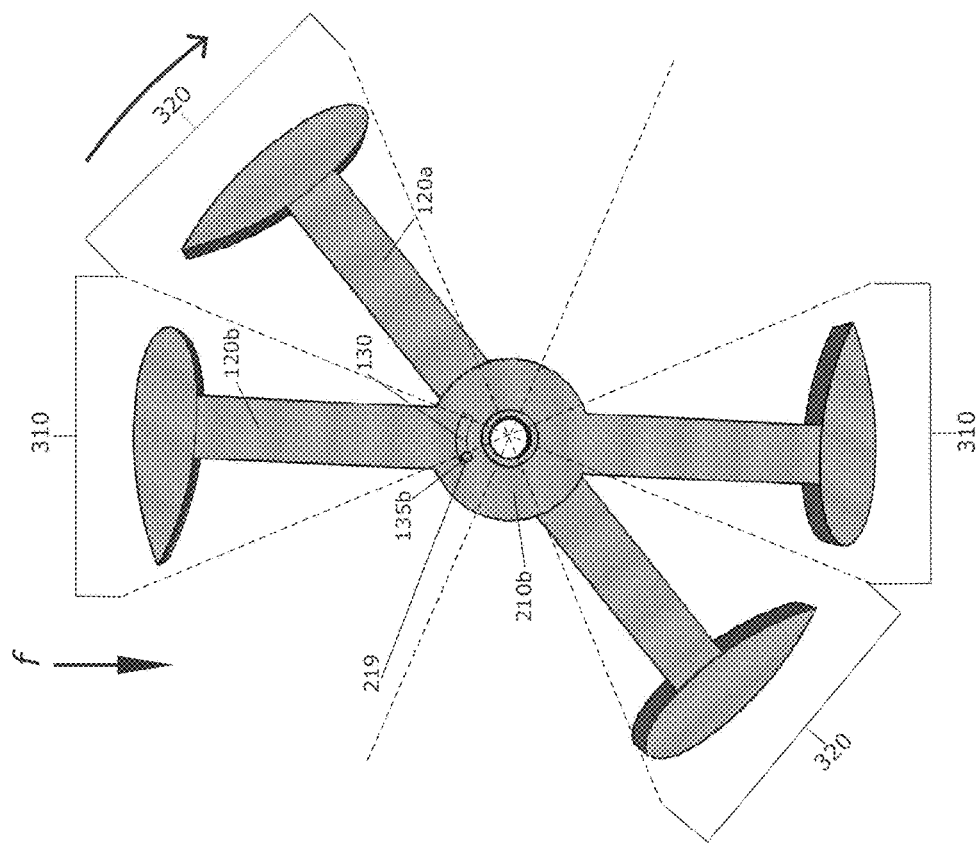
FIG. 10b is a rear perspective view of two traverse sets according to an exemplary embodiment.
Figure 10A:
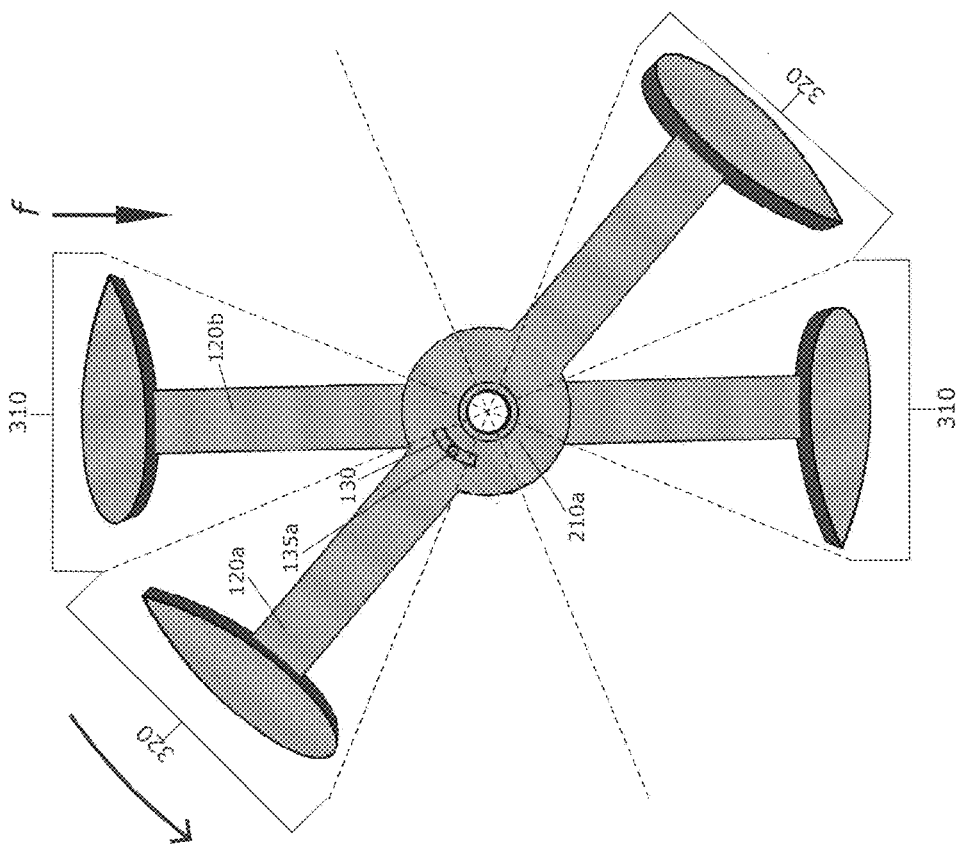
FIG. 10a is a front perspective view of two traverse sets according to an exemplary embodiment.

In one embodiment, as shown in FIGS. 10a-10b, the first traverse set 120a coupled to the first speed adjusting member 210a can be positioned within a neutral zone 320 and the second traverse set 120b coupled to the second speed adjusting member 210b can be positioned within a pushing zone 310, so that the first speed adjusting member 210a does not affect a negative rotational force onto the disc 130 by way of the first pin 135a. Upon the first traverse set 120a coupled to the first speed adjusting member 210a traveling to a position within a pushing zone 310 and the second traverse set 120b coupled to the second speed adjusting member 210b traveling to a position within a neutral zone 320, the second speed adjusting member 210b does not affect a negative rotational force onto the disc 130 by way of the second pin 135b.

In one embodiment, the speed adjusting member 210 is configured to allow for the rotational speed of the traverse set 120 to vary during the rotation of the traverse set 120. In one embodiment, the speed adjusting member 210 is configured to rotationally engage the disc 130 such that the traverse set 120 and/or speed adjusting member 210 rotates at a speed different than the speed of the disc 130. Specifically, the void 212 is configured to allow for the disc 130 to rotate at a rotational speed different than the rotational speed of the speed adjusting member. In one embodiment, the void is configured to allow for the first speed adjusting member 210a to rotate at a rotational speed different than the rotational speed of the second speed adjusting member. In one embodiment, the void 212 of the speed adjusting member 210 is configured to allow for the pin 135 to travel the length of the void 212 at a first speed while the speed adjusting member 210 rotates at a second speed. In one embodiment, the pin 135 travels from the rear stop 219 to the front stop 218 at a first speed while the speed adjusting member 210 rotates at a second speed. In one embodiment, the pin 135 travels from the front stop 218 to the rear stop 219 at a first speed while the speed adjusting member 210 rotates at a second speed. Where the speed adjusting member 210 has a rotational speed that is greater than the disc 130, the traverse set 120 coupled to the speed adjusting member 210 is positioned within the pulling zone 330 or the neutral zone 320. Where the speed adjusting member 210 has a rotational speed that is less than the disc 130, the traverse set 120 coupled to the speed adjusting member 210 is positioned within a pushing zone 310 or the neutral zone 320.

By way of example, without limitation, the orthogonal turbine 100 can have a first speed adjusting member 210 and a second speed adjusting member 210, a first traverse set 120, having a first traverse 121 with blade 110 coupled thereto and a second traverse 121 with blade 110 coupled thereto, is coupled to the first speed adjusting member 210, the first traverse 121 is positioned on the first speed adjusting member 210 at 180 degrees from the second traverse 121, and a second traverse set 120, having a third traverse 121 with blade 110 coupled thereto and a four traverse 121 with a blade 110 coupled thereto, is coupled to the second speed adjusting member 210, the third traverse 121 is positioned on the second speed adjusting member 210 at 180 degrees from the fourth traverse 121, where the first traverse set 120 is positioned in relation to the shaft 140 at 90 degrees from the second traverse set 120. While in this example, the rotational forces affected onto to the disc 130 by the first traverse 121 and the third traverse 121 are described, it is to be understood that the second traverse 121 can affect a rotational force onto the disc 130 in a similar manner as described for the first traverse 121 and the fourth traverse 121 can affect a rotational force onto the disc 130 in a similar manner as described for the third traverse 121.

Where the first traverse 121 is in a position of the range between 0 and 45 degrees, the blade 110 coupled to the first traverse 121 exerts a positive rotational force onto the first traverse 121 and thereby a positive rotational force onto the first speed adjusting member 210. The first speed adjusting member 210 rotates the disc 130 by the rear stop 219 touching the pin 135 thereby exerting a positive rotational force onto the pin 135 and thus the disc 130. As the first traverse 121 rotates through the range between 0 and 45 degrees, the positive rotational force upon the blade 110 coupled to the first traverse 121 decreases, and thus the rotational speed of the first speed adjusting member 210 decreases.

Where the first traverse 121 is in a position of the range between 0 and 45 degrees, the third traverse 121 is in a position of the range between 90 and 135 degrees. Where the third traverse 121 is in a position of the range between 90 and 135 degrees, the blade 110 coupled to the third traverse 121 exerts a positive rotational force onto the third traverse 121 and thereby a positive rotational force onto the second speed adjusting member 210. As the third traverse 121 rotates through the range between 90 and 135 degrees, the positive rotational force upon the blade 110 coupled to the third traverse 121 increases, and thus the rotational speed of the second speed adjusting member 210 increases. At one position of the third traverse 121 within the range between 90 and 135 degrees, the rotational speed of the second speed adjusting member 210 has increased such that the rotational speed of the second speed adjusting member 210 is greater than the rotational speed of the disc 130 and pin 135 coupled to the disc 130. By the second speed adjusting member 210 having a rotational speed greater than the pin 135, the rear stop 219 travels toward the pin 135. The rear stop 219 of the second speed adjusting member 210 travels toward the pin 135 received by a void 212 in the second speed adjusting member 210 due to the rotational speed of the first traverse 121 being less than the rotational speed of the third traverse 121. Where the rotational speed of the first traverse 121 is less than the rotational speed of the third traverse 121, the first traverse 121 does not apply a rotational force to the disc 130. Upon the rear stop 219 of the second speed adjusting member 210 reaching the pin 135, the rear stop 219 touches the pin 135 thereby exerting a rotational force onto the pin 135 and thus onto the disc 130.

Where the first traverse 121 is in a position of the range between 45 and 90 degrees, the blade 110 coupled to the first traverse 121 exerts a rotational force onto the first traverse 121 and thereby a rotational force onto the first speed adjusting member 210. As the first traverse 121 rotates through the range between 45 and 90 degrees, the force upon the blade 110 coupled to the first traverse 121 decreases, and thus the rotational speed of the first speed adjusting member 210 decreases. At one position of the first traverse 121 within the range between 45 and 90 degrees, the rotational speed of the first speed adjusting member 210 has decreased such that the rotational speed of the first speed adjusting member 210 is less than the rotational speed of the disc 130 and pin 135 coupled to the disc 130. By the first speed adjusting member 210 having a rotational speed less than the pin 135, the pin 135 travels toward the front stop 218. The pin 135 received by a void 212 in the first speed adjusting member 210 travels toward the front stop 218 of the first speed adjusting member 210 due to the rotational speed of the first traverse 121 being less than the rotational speed of the third traverse 121. Where the rotational speed of the first traverse 121 is less than the rotational speed of the third traverse 121, the first traverse 121 does not apply a rotational force to the disc 130. Upon the pin 135 reaching the front stop 218 of the first speed adjusting member 210, the pin 135 touches the front stop 218 thereby exerting a rotational force onto the first speed adjusting member 210 and thus onto the first traverse 121.

Where the first traverse 121 is in a position of the range between 45 and 90 degrees, the third traverse 121 is in a position of the range between 135 and 180 degrees. Where the third traverse 121 is in the position of the range between 135 and 180 degrees, the blade 110 coupled to the third traverse 121 exerts a rotational force onto the third traverse 121 and thereby a rotational force onto the second speed adjusting member 210. The second speed adjusting member 210 rotates the disc 130 by the rear stop 219 touching the pin 135 thereby exerting a rotational force onto the pin 135 and thus the disc 130. As the third traverse 121 rotates through the range between 135 and 180 degrees, the force upon the blade 110 coupled to the third traverse 121 increases, and thus the rotational speed of the second speed adjusting member 210 increases.

Where the first traverse 121 is in a position of the range between 90 and 135 degrees, the blade 110 coupled to the first traverse 121 exerts a rotational force onto the first traverse 121 and thereby a rotational force onto the first speed adjusting member 210. As the first traverse 121 rotates through the range between 90 and 135 degrees, the force upon the blade 110 coupled to the first traverse 121 increases, and thus the rotational speed of the first speed adjusting member 210 increases. At one position of the first traverse 121 within the range between 90 and 135 degrees, the rotational speed of the first speed adjusting member 210 has increased such that the rotational speed of the first speed adjusting member 210 is greater than the rotational speed of the disc 130 and pin 135 coupled to the disc 130. By the first speed adjusting member 210 having a rotational speed greater than the pin 135, the rear stop 219 travels toward the pin 135. The rear stop 219 travels toward the pin 135 due to the rotational speed of the third traverse 121 decreasing to a speed less than the rotational speed of the first traverse 121. The decrease in the rotational speed of the third traverse 121 causes the third traverse 121 to not apply a rotational force to the disc 130. Upon the rear stop 219 reaching the pin 135, the rear stop 219 touches the pin 135 thereby exerting a rotational force onto the pin 135 and thus onto the disc 130.

Where the first traverse 121 is in a position of the range between 90 and 135 degrees, the third traverse 121 is in a position of the range between 180 and 225 degrees. Where the third traverse 121 is in a position of the range between 180 and 225 degrees, the blade 110 coupled to the third traverse 121 exerts a rotational force onto the third traverse 121 and thereby a rotational force onto the second speed adjusting member 210. The second speed adjusting member 210 rotates the disc 130 by the rear stop 219 touching the pin 135 thereby exerting a rotational force onto the pin 135 and thus the disc 130. As the third traverse 121 rotates through the range between 180 and 225 degrees, the force upon the blade 110 coupled to the third traverse 121 decreases, and thus the rotational speed of the second speed adjusting member 210 decreases.

Where the first traverse 121 is in the position of the range between 135 and 180 degrees, the blade 110 coupled to the first traverse 121 exerts a rotational force onto the first traverse 121 and thereby a rotational force onto the first speed adjusting member 210. The first speed adjusting member 210 rotates the disc 130 by the rear stop 219 touching the pin 135 thereby exerting a rotational force onto the pin 135 and thus the disc 130. As the first traverse 121 rotates through the range between 135 and 180 degrees, the force upon the blade 110 coupled to the first traverse 121 increases, and thus the rotational speed of the first speed adjusting member 210 increases.

Where the first traverse 121 is in the position of the range between 135 and 180 degrees, the third traverse 121 is in a position of the range between 225 and 270 degrees. Where the third traverse 121 is in a position of the range between 225 and 270 degrees, the blade 110 coupled to the third traverse 121 exerts a rotational force onto the third traverse 121 and thereby a rotational force onto the second speed adjusting member 210. As the third traverse 121 rotates through the range between 225 and 270 degrees, the force upon the blade 110 coupled to the third traverse 121 decreases, and thus the rotational speed of the second speed adjusting member 210 decreases. At one position of the third traverse 121 within the range between 225 and 270 degrees, the rotational speed of the second speed adjusting member 210 decreases such that the rotational speed of the second speed adjusting member 210 is less than the rotational speed of the disc 130 and pin 135 coupled to the disc 130. By the second speed adjusting member 210 having a rotational speed less than the pin 135, the pin 135 travels toward the front stop 218 of the second speed adjusting member 210. The pin 135 received by a void 212 in the second speed adjusting member 210 travels toward the front stop 218 of the second speed adjusting member 210 due to the rotational speed of the third traverse 121 being less than the rotational speed of the first traverse 121. Where the rotational speed of the third traverse 121 is less than the rotational speed of the first traverse 121, the third traverse 121 does not apply a rotational force to the disc 130. Upon the pin 135 reaching the front stop 218 of the second speed adjusting member 210, the pin 135 touches the front stop 218 thereby exerting a rotational force onto the second speed adjusting member 210 and thus onto the third traverse 121.

Where the first traverse 121 is in a position of the range between 180 and 225 degrees, the first traverse 121 and blade 110 coupled thereto affect a rotational force onto the disc 130 in a similar manner as described with the first traverse 121 in a position of the range between 0 and 45 degrees. Where the first traverse 121 is in a position of the range between 225 and 270 degrees, the first traverse 121 and blade 110 coupled thereto affect a rotational force onto the disc 130 in a similar manner as described with the first traverse 121 in a position of the range between 45 and 90 degrees. Where the first traverse 121 is in a position of the range between 270 and 315 degrees, the first traverse 121 and blade 110 coupled thereto affect a rotational force onto the disc 130 in a similar manner as described with the first traverse 121 in a position of the range between 90 and 135 degrees. Where the first traverse 121 is in a position of the range between 315 and 360 degrees, the first traverse 121 and blade 110 coupled thereto affect a rotational force onto the disc 130 in a similar manner as described with the first traverse 121 in a position of the range between 135 and 180 degrees.

Where the third traverse 121 is in a position of the range between 270 and 315 degrees, the third traverse 121 and blade 110 coupled thereto affect a rotational force onto the disc 130 in a similar manner as described with the third traverse 121 in a position of the range between 90 and 135 degrees. Where the third traverse 121 is in a position of the range between 315 and 360 degrees, the third traverse 121 and blade 110 coupled thereto affect a rotational force onto the disc 130 in a similar manner as described with the third traverse 121 in a position of the range between 135 and 180 degrees. Where the third traverse 121 is in a position of the range between 0 and 45 degrees, the third traverse 121 and blade 110 coupled thereto affect a rotational force onto the disc 130 in a similar manner as described with the third traverse 121 in a position of the range between 180 and 225 degrees. Where the third traverse 121 is in a position of the range between 45 and 90 degrees, the third traverse 121 and blade 110 coupled thereto affect a rotational force onto the disc 130 in a similar manner as described with the third traverse 121 in a position of the range between 225 and 270 degrees.

Figure 11A:
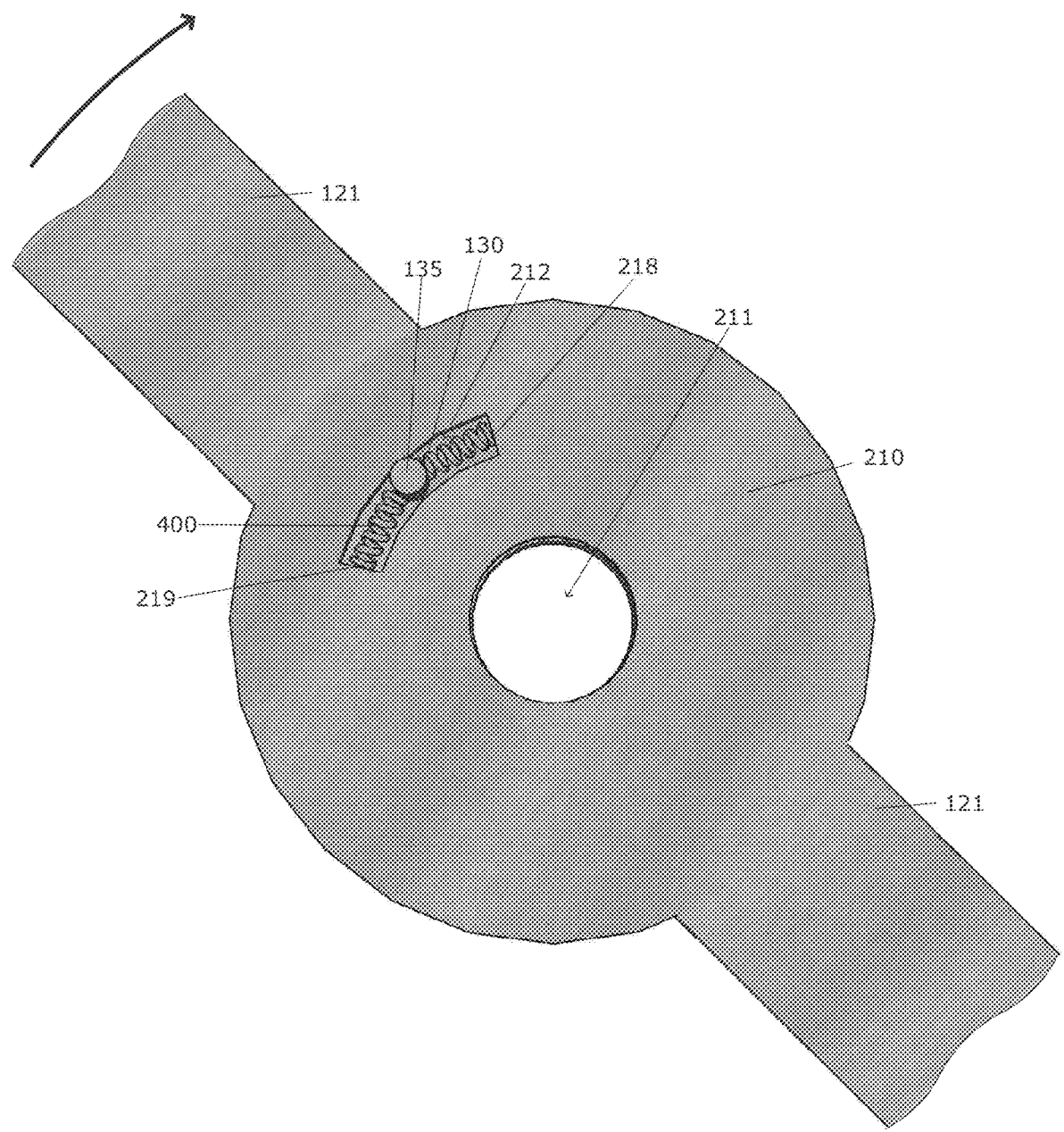
FIG. 11a is a perspective view of a speed adjusting member according to an exemplary embodiment.
Figure 11B:
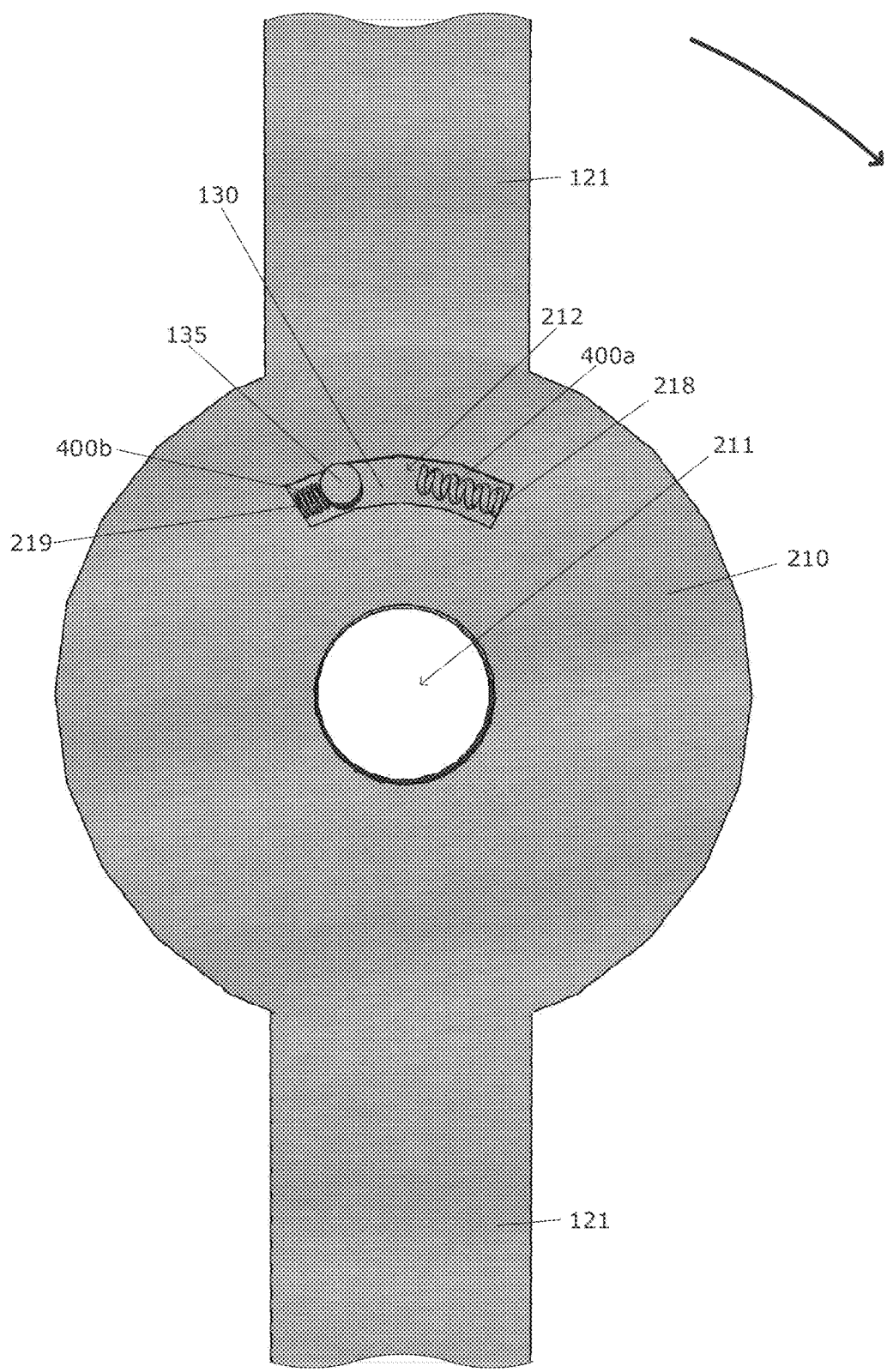
FIG. 11b is a perspective view of a speed adjusting member according to an exemplary embodiment.

In one embodiment, as shown in FIGS. 11a-b, the orthogonal turbine 100 can have a spring 400 configured to accelerate and/or decelerate the rotational speed of the disc 130, accelerate and/or decelerate the rotational speed of the speed adjusting member 210, or any combination thereof. The spring 400 can be coupled to the speed adjusting member 210, and/or the disc 130. In one embodiment, the spring 400 can be positioned within the void 212. In one embodiment, the spring 400 is coupled to the speed adjusting member 210 at the front stop 218 and rear stop 219 where one end of the spring 400 is coupled to the front stop 218 and the other end of the spring 400 is coupled to the rear stop 219. The spring 400 can be coupled to the disc 130. In one embodiment, the spring 400 is coupled to the pin 135 of the disc 130. The spring 400 can be coupled to the disc 130 at any location on the spring 400, for example, without limitation, the middle portion of the spring 400, the end portion of the spring 400, or the like.

In one embodiment, the spring can have two members or portions, a first spring member 400a and a second spring member 400b. In one embodiment, where the pin 135 is positioned substantially in the middle of the void 212, the first spring member 400a can engage the front stop 218 and the pin 135 and the second spring member 400b can engage the rear stop 219 and the pin 135.

At least a portion of the spring 400 can be configured to compress between the front stop 218 and the pin 135 and/or between the rear stop 219 and the pin 135. The spring 400 can be configured so that at least a portion of the spring 400 is compressed upon the rotation of the speed adjusting member 210. Where at least a portion of the spring 400 is compressed between the front stop 218 and the pin 135, the spring 400 can affect a force onto the front stop 218 and/or the pin 135. The spring 400 can affect a positive force onto the front stop 218 and/or a negative force onto the pin 135. The positive force affected onto the front stop 218 can result in an acceleration of the rotational speed of the speed adjusting member 210. The negative force affected onto the pin 135 can result in a deceleration of the rotational speed of the disc 130.

Where at least a portion of the spring 400 compressed between the rear stop 219 and the pin 135, the spring 400 can affect a force onto the rear stop 219 and/or the pin 135. The force can affect a negative force onto the rear stop 219 and/or a positive force onto the pin 135. The negative force affected onto the rear stop 219 can result in a deceleration of the rotational speed of the speed adjusting member 210. The positive force affected onto the pin 135 can result in an acceleration of the rotational speed of the disc 130.

In one embodiment, the orthogonal turbine 100 can have at least one bearing 150 configured to prevent the speed adjusting member 210 and/or the disc 130 from traversing the shaft 140. The bearing 150 can prevent the speed adjusting member 210 and/or disc 130 from traversing the shaft 140 and minimize the rotational friction between the speed adjusting member 210 and the bearing 150. The bearing 150 can have a hole configured to receive the shaft 140. The bearing 150 can be positioned upon the shaft 140 so that the speed adjusting member 210 touches the bearing 150. In one embodiment, the exterior surface of the speed adjusting member 210 touches the interior surface of the bearing 150. The orthogonal turbine 100 can have a first bearing 150a touching a first speed adjusting member 210a and a second bearing 150b touching the second speed adjusting member 210b.

In one embodiment, the orthogonal turbine 100 can be a component of an electric power generation system (not shown). The electric power generation system can have a generator for converting mechanical energy to electrical energy. While the generator can be any mechanism for converting mechanical energy to electrical energy, the generator is preferably a coaxial generator that allows for rotation speed variations that increases the energy output upon a change in medium flow f. The generator is coupled to the orthogonal turbine 100. In one embodiment, the generator can be coupled to the shaft 140. In one embodiment, the generator can be coupled to a generator shaft which in turn can be coupled to the shaft. Since the generator shaft can be coupled to the shaft 140, rotation of the shaft 140 results in rotation of the generator shaft. A wire or cable capable of allowing electricity to travel between two locations can be coupled to the generator at one end of the wire.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "coupled" or "coupled to" another element, it can be directly coupled or coupled to the other element or intervening elements may be present. Furthermore, "coupled" or "coupled" as used herein may include wirelessly coupled or coupled. As used herein, the term "and/or" includes any and all combinations of one or more of the associated listed items.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

Modifications and variations of the present invention are possible in light of the above teachings. It is therefore to be understood that the invention may be practiced otherwise than as specifically described herein.

What is claimed is:

1. An orthogonal turbine comprising:
   a first blade,
   a second blade,
   a first traverse connected to the first blade,
   a second traverse connected to the second blade,
   a first speed adjusting member having a front surface, back surface, an exterior edge surface, a first void, a first rear stop, and a first front stop,
   a second speed adjusting member,
   a disc having a first pin connected to the disc,
   a shaft connected to the disc, and
   a spring, wherein the shaft is configured to rotationally engage the first speed adjusting member and the shaft is configured to rotationally engage the second speed adjusting member, wherein the first speed adjusting member is connected to the first traverse, wherein the second speed adjusting member is connected to the second traverse, wherein the first speed adjusting member is rotationally engaged to the second speed adjusting member, wherein the first void is configured to receive the first pin, and wherein the spring is coupled to the first speed adjusting member.

2. The orthogonal turbine of claim 1 wherein the second speed adjusting member comprises a second void, a second rear stop, and a second front stop, wherein the disc further comprises a second pin connected to the disc, and wherein the second void is configured to receive the second pin.

3. The orthogonal turbine of claim 1 wherein the first void is configured to receive the spring.

4. The orthogonal turbine of claim 1 wherein the spring is configured to touch the first front stop.

5. The orthogonal turbine of claim 1 wherein the spring is configured to touch the first rear stop.

6. The orthogonal turbine of claim 1 further comprising a first bearing configured to touch the first speed adjusting member and a second bearing configured to touch the second speed adjusting member.

7. The orthogonal turbine of claim 1 wherein the first void is configured to allow for the disc to rotate through at least a portion of a rotation without the first traverse applying a negative rotational force to the disc.

8. The orthogonal turbine of claim 1 wherein the first void is configured to allow for the first pin to travel a distance within the first speed adjusting member without touching the first speed adjusting member.

9. The orthogonal turbine of claim 1 wherein the first void is configured to allow for the disc to rotate at a rotational speed different than a rotational speed of the first speed adjusting member.

10. The orthogonal turbine of claim 1 wherein the first void is configured to allow for the first speed adjusting member to rotate at a rotational speed different than a rotational speed of the second speed adjusting member.

11. The orthogonal turbine of claim 1 where the first speed adjusting member and second speed adjusting member are in a first position, the first speed adjusting member is configured to transfer a rotational force to the second speed adjusting member, and wherein where the first speed adjusting member and second speed adjusting member are in a second position, the second speed adjusting member is configured to transfer a rotational force to the first speed adjusting member.

12. The orthogonal turbine of claim 1 wherein the first speed adjusting member is configured to transfer a rotational force to the second speed adjusting member by way of the first rear stop touching the first pin, and wherein the second speed adjusting member is configured to transfer a rotational force to the first speed adjusting member by way of the first pin touching the first front stop.

13. The orthogonal turbine of claim 2 wherein the first speed adjusting member is configured to transfer a rotational force to the second speed adjusting member by way of the first rear stop touching the first pin and the second pin touching the second front stop, and wherein the second speed adjusting member is configured to transfer a rotational force to the first speed adjusting member by way of the second rear stop touching the second pin and the first pin touching the first front stop.

14. The orthogonal turbine of claim 1 wherein the first speed adjusting member and second speed adjusting member are configured so that the radial degrees between the first traverse and second traverse, where the first traverse is in a first position and the second traverse is in a first position, are different than the radial degrees between the first traverse and second traverse, where the first traverse is in a second position and the second traverse is in a second position.

15. The orthogonal turbine of claim 1 wherein the first speed adjusting member and second speed adjusting member are configured so that where the first traverse is in a first position and the second traverse is in a first position, the first traverse is positioned in a pushing zone and the second traverse is positioned in a neutral zone, and where the first traverse is in a second position and the second traverse is in a second position, the first traverse is in a pushing zone and the second traverse is in a pulling zone.

16. The orthogonal turbine of claim 1 wherein the first speed adjusting member is a disc.

17. The orthogonal turbine of claim 1 wherein the first speed adjusting member comprises a hole, wherein the hole is configured to receive the shaft.

18. The orthogonal turbine of claim 17 wherein the hole of the first speed adjusting member is positioned in the center of the first speed adjusting member.

19. The orthogonal turbine of claim 1 wherein the disc is positioned between the first speed adjusting member and the second speed adjusting member.

* * * * *